United States Patent [19]
Miura

[11] 3,793,153
[45] Feb. 19, 1974

[54] METHOD FOR PROPAGATING YEASTS AND MOLDS BY MIXED CULTURING AND METHOD OF FERMENTATION THEREOF

[76] Inventor: Yoshiharu Miura, 8-28, Katagiri-cho, Ibaragi-shi, Osaka, Japan

[22] Filed: May 27, 1971

[21] Appl. No.: 147,422

[30] Foreign Application Priority Data
June 6, 1970  Japan.................................. 45-48904

[52] U.S. Cl................... 195/111, 195/28 R, 195/66
[51] Int. Cl............................................. C12b 1/00
[58] Field of Search...................................... 195/111

[56] References Cited
UNITED STATES PATENTS

| | | |
|---|---|---|
| 2,766,176 | 10/1956 | Jeffreys............................ 195/111 X |
| 2,636,823 | 4/1953 | de Becze.......................... 195/111 X |
| 1,875,401 | 9/1932 | Woodruff et al. ............... 195/111 X |
| 3,536,586 | 10/1970 | Lee et al........................... 195/111 X |
| 3,667,968 | 6/1972 | Kasik et al....................... 195/111 X |

Primary Examiner—Alvin E. Tanenholtz
Assistant Examiner—Robert J. Warden
Attorney, Agent, or Firm—Fitzpatrick, Cella, Harper & Scinto

[57] ABSTRACT

A strain of bacteria is added to a fermentation system wherein yeasts or molds capable of assimilating hydrocarbons or carbohydrates are fermented using hydrocarbons or carbohydrates as the main carbon source, and mixed culturing is carried out.

6 Claims, 4 Drawing Figures

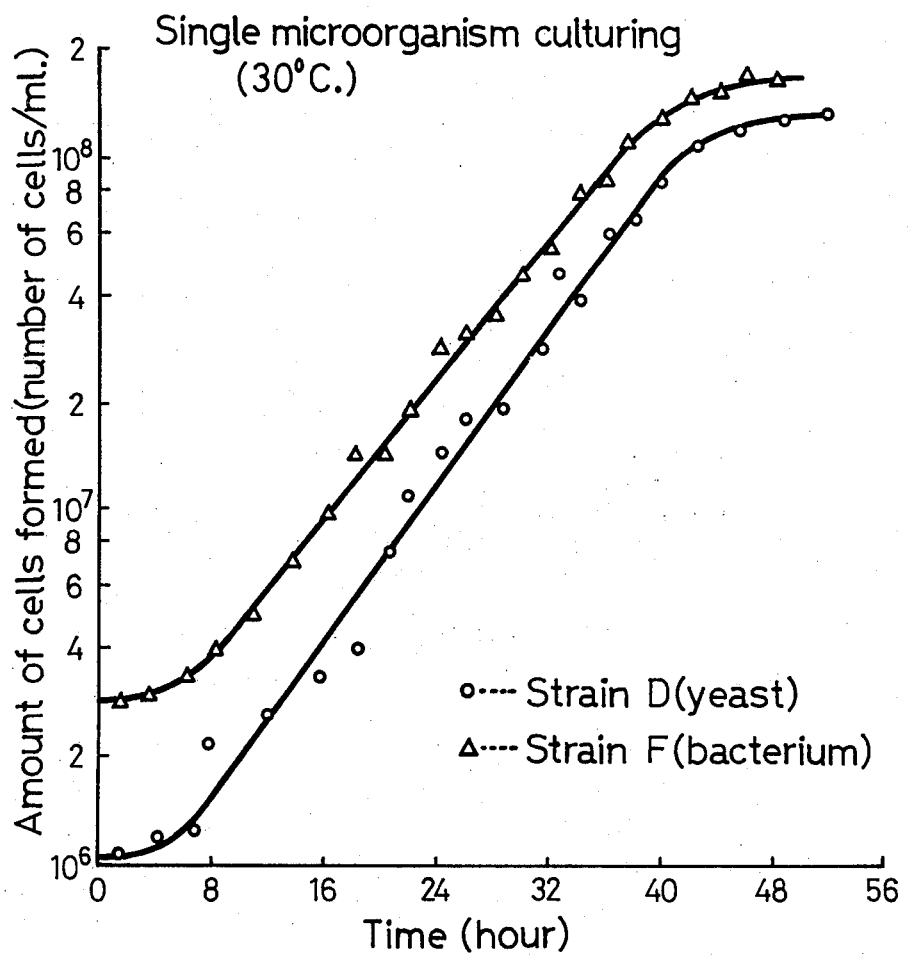

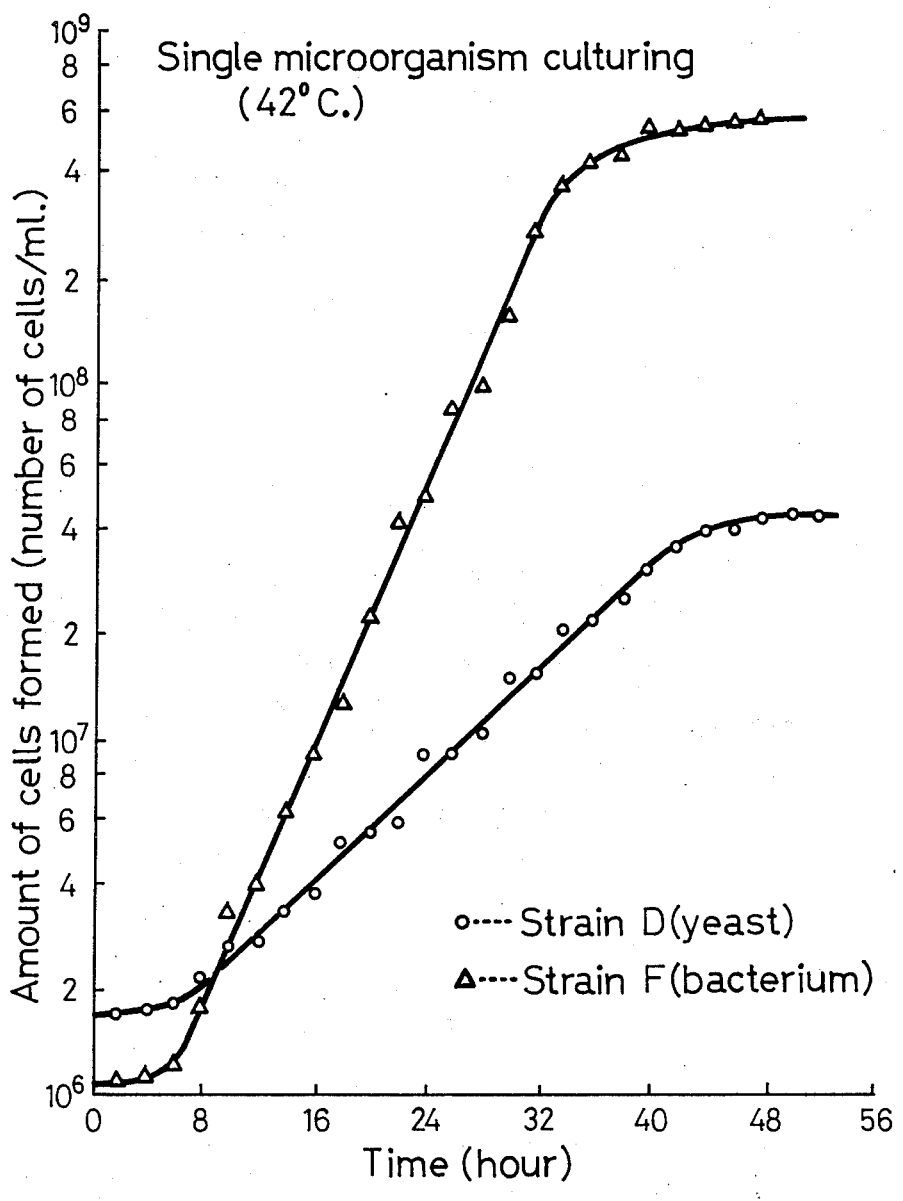

3,793,153

METHOD FOR PROPAGATING YEASTS AND MOLDS BY MIXED CULTURING AND METHOD OF FERMENTATION THEREOF

BACKGROUND OF THE INVENTION

The present invention relates to a method for propagating microbial cells wherein yeasts or molds capable of assimilating hydrocarbons or carbohydrates are fermented using hydrocarbons or carbohydrates as a main carbon source, and mixed culturing is carried out by adding bacteria to the fermentation system.

Great interest has recently developed in the use of hydrocarbons and carbohydrates as the main carbon source in fermentation and assimilation processes. For example, considerable research has been directed toward the utilization of unicellular protein obtained by propagating microorganisms using petroleum hydrocarbons as the main carbon source, as well as the production of metabolic products such as, enzymes, amino acids, vitamins, organic acids and other useful substances. However, research in this area for industrial purposes has been directed only to the cultivation of a single pure strain of microorganism for a specific end product.

The principal considerations in industrial processes are the growth rate of the microorganisms in the culture and the yield of desired metabolic products. The present invention is, in part, based upon the finding that mixed cultures of one or more species of assimilating microorganisms in a culture medium wherein the carbon source is a mixture of numerous hydrocarbons such as petroleum fermentation, the range of assimilated carbon source can be broadened, the rate of carbon conversion can be increased, the kinds of metabolic products can be increased and screening is facilitated.

SUMMARY OF THE INVENTION

In the present invention, bacteria and molds or yeasts are subjected to mixed culturing in a medium containing hydrocarbons or carbohydrates as a carbon source and together with other nutrient sources necessary for the growth of the microorganisms. Although the optimum temperature for propragating bacteria is 36°C. as compared to 30°C. for yeasts and molds, and the division period of yeasts or molds is considerably longer than that of the bacteria, the mixed culturing of the present invention has the advantage that the optimum temperature for propagating yeasts or molds is considerably elevated and approaches that for propagating bacteria. Moreover, the rate of propagation is also accelerated, the range of assimilated carbon source is remarkably broadened, the yield of cells is increased and the kinds of metabolic products are increased.

The increase of the rate of fermentation and the rate of propagation due to the rise of the optimum temperature for fermentation and the increase of the yield of cells has a very important significance in the industry, because they directly relate to the increase of the yield rate of unicellular protein or useful metabolic products.

The hydrocarbon and carbohydrate assimilable microorganisms which are useful in the present invention are selected for example, as yeasts, from the families, Cryptococcaceae and Endomycetaceae; as bacteria, from the families Actinomycetaceae, Achromobacteraceae, Bacillaceae, Bacteriaceae, Micrococcaceae, Pseudomonadaceae, Mycobacteriaceae, Brevibacteriaceae and Corynebacteriaceae; and as molds, from the class Ascomycetes.

DESCRIPTION

Mixed culturing according to the present invention is preferably carried out by fermentation, under aerobic conditions, of an aqueous nutrient media such as by shaking culture or stirring culture. On an industrial scale, it is most advantageous to employ the aeration-stirring submerged culture technique.

Culturing is generally carried out at a temperature of 25° to 47°C. and at a pH OF 3.5 to 8.5. However, when a high production of yeast is desired, it is preferred to adjust the pH to be about 3.5 to 5.5. In the same respect, when a high production of bacteria or mold is desired it is preferred to adjust the pH to be about 6.0 to 8.5. Culturing time is properly determined by the strains of microorganism used, the medium composition and the desired object of culturing. However, the culturing period is generally 8–120 hours.

As for the culture medium in the present invention, those having a composition normally used in the ordinary culture of yeasts, molds and bacteria can be used. However, about 1 to 2 percent by volume of hydrocarbons or carbohydrates based on the total amount of the medium are added thereto as the carbon source. When small amounts of water-soluble vitamins, such as riboflavin, thiamine, p-aminobenzoic acid, pyridoxine hydrochloride, calcium pantothenate, nicotinic acid, biotin, folic acid, etc. are added to the medium, the growth of the microorganisms is increased.

As hydrocarbons which can be used as the carbon source, gaseous hydrocarbons, naphtha, light oil, kerosene, liquid paraffin, heavy oil, etc. are appropriate. In addition, saturated and unsaturated aliphatic, alicyclic or aromatic compounds may be used. As the carbohydrates which can be used as the carbon source, glucose, glycerol, fructose, sucrose, maltose, mannose, mannitol, xylose, galactose, starch, starch hydrolyzate, molasses, etc. can be used.

As the nitrogen source, peptone, NZ amine, meat extract, yeast extract, corn steep liquor, soy bean powders, protein hydrolyzate, inorganic nitrates, ammonium salts, etc. can be used. Further, as inorganic salts, sodium chloride, calcium chloride, magnesium sulfate, calcium carbonate, phosphates, and small amounts of heavy metal salts such as iron, copper, manganese salts, etc. can be used.

Since hydrocarbons are almost insoluble in water, it is preferable, when added to the liquid medium, to vigorously stir the hydrocarbon with the aqueous solution to form a fine suspension or to add a suitable suspending agent and dissolving agent.

In practice of the invention, two groups of the strains of microorganisms are inoculated in the medium, but these two strains can be precultured separately and then the resulting precultures can be inoculated in the medium at the same time. Alternatively, one of the strains can be inoculated to the other cultured strain and then both can be inoculated in the medium. Furthermore, the two strains of microorganisms to be used may be subjected to mixed culturing in advance and the resulting mixed culture can be inoculated in the main fermentation medium. In any case, the ratio of the amounts of the two strains to be inoculated can be changed as desired according to the purpose of the culture. Generally, it is preferable that the two or more strains are inoculated respectively at a ratio of a microorganism of $10^5 - 10^7$ cells/cc. and the main culturing is carried out. Moreover, the strains of the two groups to be inoculated are not restricted to only one kind in the respective groups but more than one strain, that is, any desired number of strains may be included in the respective groups, so long as they can meet the object of the mixed culture.

After the fermentation of the mixed culture is terminated, the metabolic end products may be separated from the culture liquid in any well known manner. For example, an amino acid may be separated from the medium after removal of the microorganism cells by means of an ion exchange resin treatment.

Practice of certain specific embodiments of the invention are illustrated by the following examples:

EXAMPLE I

In this example, *Mycotorula japonica* (ATCC 20311) (Strain D) is used as the yeast strain, and *Bacillus subtilis* (ATCC 21662) (Strain F) is used as the bacterium strain. Each of the strains is initially slant-cultured on potato-agar medium at 27°C. for 24 hours. The potato-agar medium comprises 20 percent potato, 3 percent yeast extract and 1 percent hydrocarbon (mixture of $n-C_{12}H_{26}$, $n-C_{13}H_{28}$, $n-C_{14}H_{30}$, $n-C_{15}H_{32}$, and $n-C_{16}H_{34}$). In the case of carbohydrate-assimilable microorganisms, 1 percent glucose is used in place of the hydrocarbons.

After culturing, the strains are respectively inoculated by one platinum loop into 500 cc. Erlenmyer flasks containing a basal medium comprising 10 ml./l. hydrocarbons (mixture of $n-C_{12}H_{26}$, $n-C_{13}H_{28}$, $n-C_{14}H_{30}$, $n-C_{15}H_{32}$ and $n-C_{16}H_{34}$), 5.0 g./l. $NH_4H_2PO_4$, 4.0 g./l. $KH_2PO_4$, 0.3 g./l. $K_2HPO_4$, 0.4 g./l. $MgSO_4 \cdot 7H_2O$, 0.1 g./l. NaCl, 0.1 g./l. $CaCl_2 \cdot 2H_2O$, $1 \times 10^{-4}$ g./l. $CuSO_4 \cdot 5H_2O$, $4 \times 10^{-4}$ g./l. $FeCl_3 \cdot 6H_2O$, $8 \times 10^{-4}$ g./l. $MnSO_4 \cdot 7H_2O$, $4 \times 10^{-4}$ g./l. $NaMoO_4 \cdot H_2O$, $8 \times 10^{-4}$ g./l. $ZnSO_4 \cdot 7H_2O$, 1 ml./l. vitamin solution (200 mg. riboflavin, 100 mg. thiamine, 100 mg. p-aminobenzoic acid, 100 mg. pyridoxine hydrochloride, 100 mg. calcium pantothenate, 100 mg. Nicotinic acid, 1 mg. biotin and 1 mg. folic acid in 1 liter) and distilled water to adjust the volume to 1,000 ml.. In cases where the microorganisms are carbohydrate-assimilable strains, 5 percent glucose is used in place of the hydrocarbons.

The above cultures are then precultured at a temperature of 30°C. with respect to the yeast and, 46°C. with respect to the bacterium for 48 hours with shaking at an amplitude of 5 cm. and 100 reciprocations per minute. The thus obtained precultures are respectively centrifuged at 3,000 revolutions per minute for 10 minutes to collect the microbial cells which are thereafter washed with a 0.1 M phosphate buffer solution (pH 7.0).

The washed cells are then respectively inoculated into a basal medium of the same composition as given above in such manner so that the cultures contain $10^5 - 10^7$ cells/cc.. Fermentation of the main culture is carried out with shaking and thereafter the cells are counted under a microscope with a Thoma's blood cell counter for the yeast strain employed and with a bacteria counter chamber for the bacterium strain employed. For the mixed culture, the number of respective microbial cells are counted under a microscope in the same manner. The results with respect to cultivation temperatures and duration of cultivation is shown in the figures wherein:

FIG. 1A is a graph showing the propagations of the microbial cells at 30°C. in single culturing;

FIG. 2A is a graph showing the propagation of the microbial cells at 42°C, in single culturing.

Figure 1B:
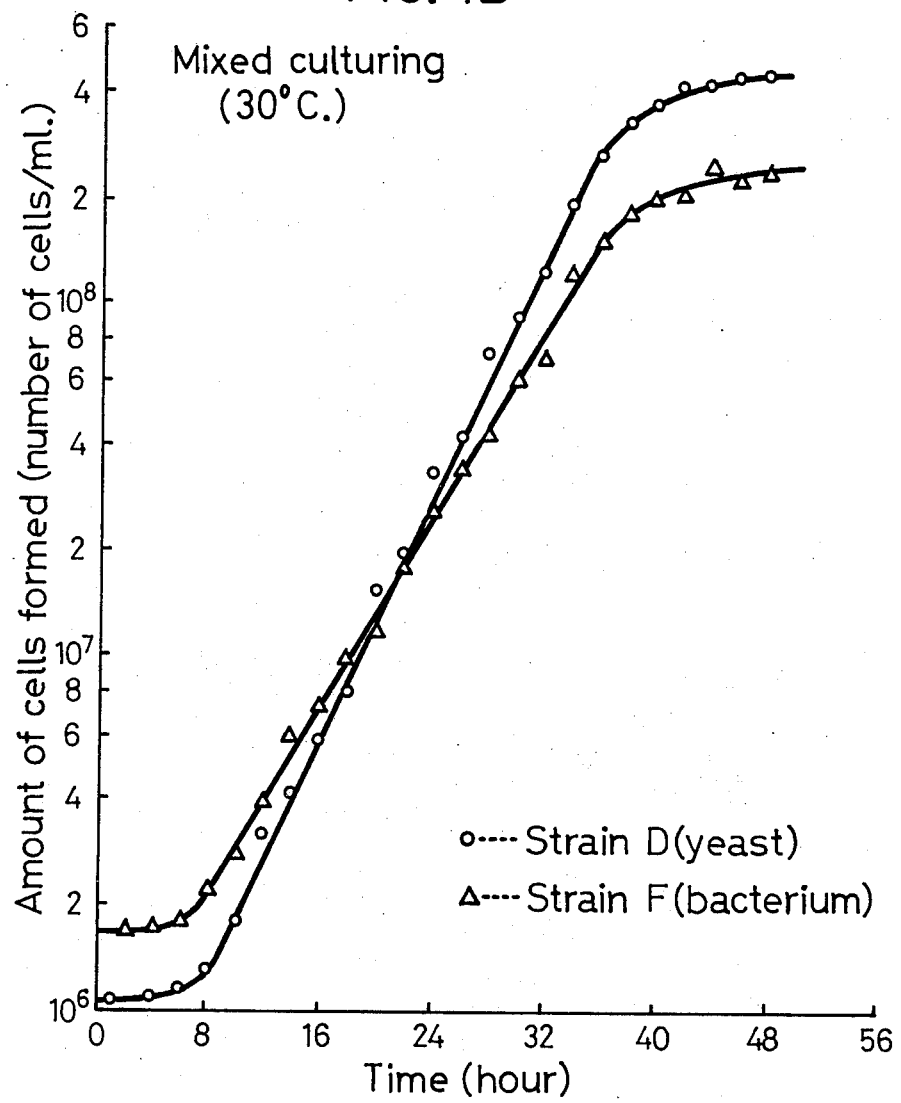
FIG. 1B is a graph showing the propagation of the microbial cells at 30°C. in mixed culturing.

In FIG. 1A, the bacterium strain Δ and yeast strain o are cultivated separately. After 48 hours, both strains reach maximum cell growth. However, as shown in FIG. 1B, maximum cell concentration occurs at about 38 hours with both strains plateauing at about the same time.

Figure 2B:
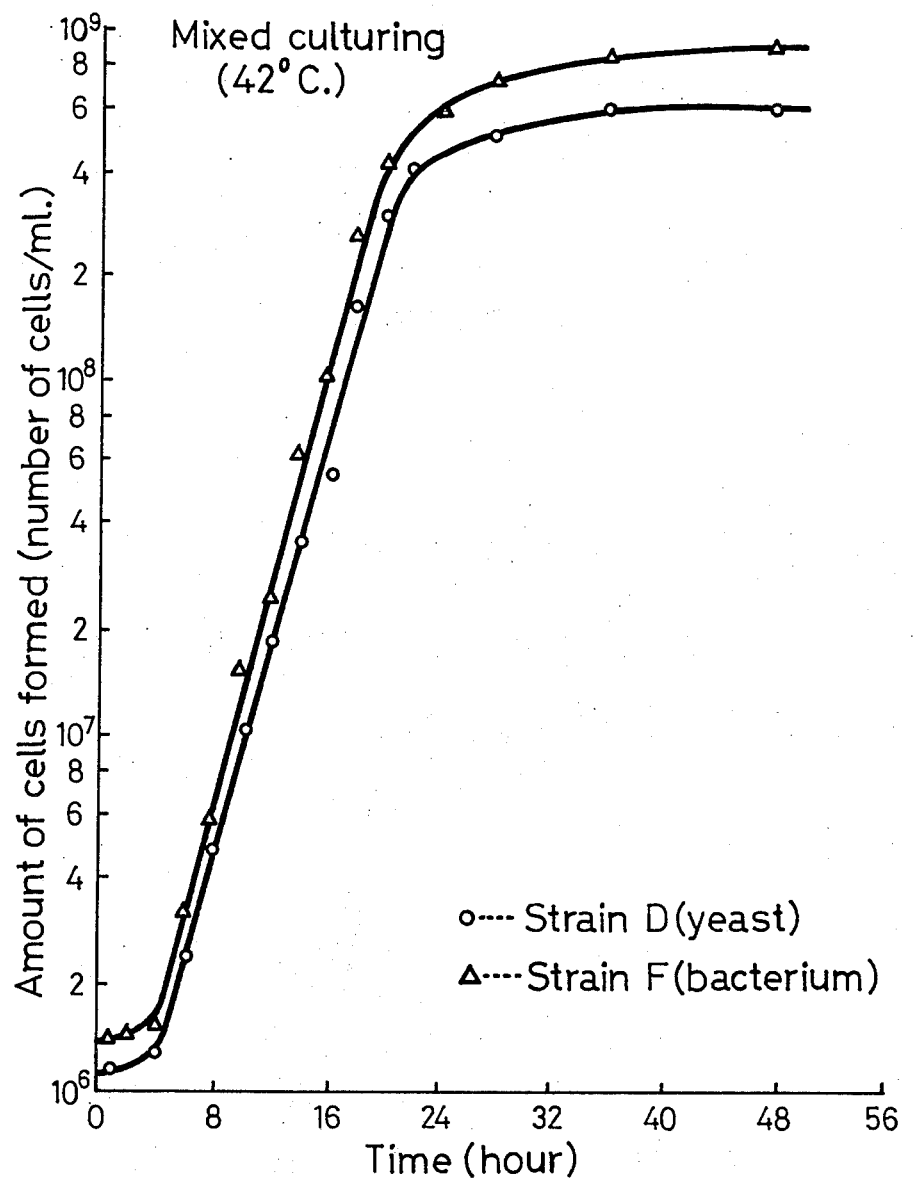
FIG. 2B is a graph showing the propagation of the microbial cells at 42°C. in mixed culturing.

When the single cultures are cultured at 42°C. as is shown in FIG. 2A, maximum concentration of the yeast strain occurs after about 40 hours of culturing. Moreover, propagation is not great. However, when culturing is mixed in accordance with the present invention, the cultivation time and degree of propagation is greatly enhanced with respect to both strains. FIG. 2B shows the results of mixed culturing at 42°C.. As is evident from the FIG. 2B, both strains exhibit maximum propagation after only about 16 hours of cultivation. In addition, both strains propagate to a much greater extent than in single culturing.

It is evident in this case from these results that the rate of propagation is accelerated and the optimum temperature for propagating is considerably elevated by mixed culturing.

EXAMPLE II

In this example, the following microorganisms are cultivated:

Yeasts:

A: *Candida lipolytica* NRRL Y-6795
B: *Torulopsis dattila* I.F.O. 0662 (ATCC 20309)
C: *Rhodotorula glutinis* I.F.O. 0388 (ATCC 20310)
D: *Mycotorula japonica* I.A.M. 4185 (ATCC 20311)

Bacteria:

E: *Nocardia corallina* I.F.O. 3338 (ATCC 21664) F: *Bacillus subtilis* JB 15(ATCC 21663)
G: *Micrococcus cerificans* I.F.O. 12552 (ATCC 21662)
H: *Pseudomonas aeruginosa* I.F.O. 3923 (ATCC 21661)
I: *Corynebacterium hydrocarboclastus* (ATCC 6946)
J: *Brevibacterium acetylicum* I.F.O. 12146 (ATCC 21665)

Molds:

K: *Penicillium janthinellum* I.F.O. 7909 (ATCC 20312)
L: *Aspergillus oryzae* I.F.O. 4290 (ATCC 20313)

Cultivation is carried out in the same manner as in Example I except that the cultivation temperature is varied and the carbon source is changed in accordance with the microorganisms used. The variables, percentages of yields of the cells and the maximum specific growth rates calculate on the basis of the numbers of microbial cells are shown in the following Tables I and II:

TABLE 1 (carbon sources: hydrocarbons)

| Microorganisms used | Culturing temperature | Hydrocarbons used (mixture) | Yield of cells (%) | Maximum specific growth rate (hour$^{-1}$) | Useful products |
|---|---|---|---|---|---|
| D | 30°C. | n-alkanes of $C_{12}$–$C_{16}$ | 75.6 | 0.124 | Aspartic acid, Glutamic acid, Leucine, Serine, Histidine, Lysine |
| F | 46°C. | n-alkanes of $C_{12}$–$C_{16}$ | 67.3 | 0.301 | Dipicolinic acid, Aspartic acid, Glutamic acid, Alamine, Leucine, Arginine, Lysine |
| D + F | 42°C. | n-alkanes of $C_{12}$–$C_{16}$ | 90.3 | D=0.341 F=0.347 | Aspartic acid, Glutamic acid, Leucine, Serine, Histidine, Lysine, Arginine, Alanine |
| A | 30°C. | n-alkanes of $C_{12}$–$C_{19}$ | 74.2 | 0.131 | Oil and fat, Citric acid, Aspartic acid, Glutamic acid, Leucine, Histidine |
| E | 41°C. | n-alkanes of $C_5$–$C_{14}$ | 68.1 | 0.292 | Fat, Lysine, Diaminopimelic acid, Homoserine, Ornithine, Phenylalanine, Tyrosine, Citrulline, Polycarboxylic acids |
| A + E | 32°C. | n-alkanes of $C_{10}$–$C_{16}$ | 87.1 | A=0.235 E=0.242 | Fat, Oil and Fat, Citric acid, Glutamic acid, Aspartic acid, Lysice, Leucine, Diaminopimelic acid, Homoserine, Ornithine, Phenylalanine, Tyrosine, Citrulline, Polycarboxylic acids |
| A + F | 37°C. | n-alkanes of $C_{10}$–$C_{18}$ | 98.8 | A=0.346 F=0.367 | Oil and fat, Citric acid, Glutamic acid, Aspartic acid, Leucine, Arginine, Lysine |
| G | 40°C. | n-alkanes of $C_6$–$C_{14}$ | 69.3 | 0.253 | Alanine, Valine, Aspartic acid, Glutamic acid, Leucine, Arginine, Lysine |
| A + G | 35°C. | n-alkanes of $C_6$–$C_{18}$ | 94.5 | A=0.306 G=0.311 | Oil and fat, Citric acid, Glutamic acid, Aspartic acid, Leucine, Arginine, Lysine |
| H | 37°C. | n-alkanes of $C_5$–$C_{16}$ | 72.9 | 0.29 | Salicyclic acid, Biotin-related substances, Catechol, Aspartic acid, Leucine, Isoleucine, Dipicolinic acid |
| A + H | 37°C. | n-alkanes of $C_{10}$–$C_{16}$ | 96.8 | A=0.326 H=0.341 | Oil and fat, Citric acid, Glutamic acid, Aspartic acid, Leucine, Arginine, Lysine |
| I | 38°C. | n-alkanes of $C_8$–$C_{14}$ | 72.1 | 0.23 | Glutamic acid, Alanine, Valine, Glycine, Lysine, Diaminopimelic acid, Homoserine, Ornithine, Citrulline, Tyrosine, Phenylalanine, Polycarboxylic acids |
| A + I | 36°C. | n-alkanes of $C_8$–$C_{14}$ | 95.1 | A=0.299 I=0.314 | Oil and fat, Citric acid, vitamin $B_{12}$, Glutamic acid, Aspartic acid, Leucine |
| J | 28°C. | n-alkanes of $C_{10}$–$C_{16}$ | 71.6 | 0.152 | Glutamic acid, Aspartic acid, Leucine Lysine, Leucine |
| A + J | 32°C. | n-alkanes of $C_{10}$–$C_{16}$ | 76.6 | A=0.181 J=0.193 | Oil and fat, Citric acid, Glutamic acid, Aspartic acid, Arginine, Lysine, Leucine |
| B | 30°C. | n-alkanes of $C_{12}$–$C_{19}$ | 73.7 | 0.125 | Aspartic acid, Glutamic acid, Leucine, Histidine |
| B + E | 32°C. | n-alkanes of $C_{10}$–$C_{16}$ | 85.8 | B=0.235 E=0.246 | Glutamic acid, Aspartic acid, Leucine, Histidine, Lysine, Diaminopimelic acid, Homoserine, Ornithine |
| B + F | 37°C. | n-alkanes of $C_{10}$–$C_{16}$ | 92.4 | B=0.332 F=0.349 | Glutamic acid, Aspartic acid, Leucine, Histidine, Arginine, Lysine |
| B + G | 35°C. | n-alkanes of $C_{10}$–$C_{16}$ | 90.2 | B=0.278 G=0.293 | Glutamic acid, Aspartic acid, Leucine, Histidine, Arginine, Lysine |
| B + H | 37°C. | n-alkanes of $C_{10}$–$C_{16}$ | 91.2 | B=0.313 H=0.325 | Glutamic acid, Aspartic acid, Leucine, Histidine, Arginine, Lysine |
| B + I | 37°C. | n-alkanes of $C_{10}$–$C_{16}$ | 91.3 | B=0.304 I=0.324 | Vitamin $B_{12}$, Glutamic acid, Aspartic acid, Leucine, Histidine |
| C | 28°C. | n-alkanes of $C_{14}$–$C_{19}$ | 75.1 | 0.117 | Aspartic acid, Glutamic acid, Leucine, Histidine |
| C + E | 32°C. | n-alkanes of $C_{10}$–$C_{16}$ | 85.2 | C=0.213 E=0.249 | Glutamic acid, Aspartic acid, Leucine, Histidine, Diaminopimelic acid, Homoserine, Ornithine |
| C + F | 37°C. | n-alkanes of $C_{10}$–$C_{16}$ | 96.8 | C=0.338 F=0.354 | Glutamic acid, Aspartic acid, Leucine, Histidine, Lysine, Serine, Arginine |
| C + G | 35°C. | n-alkanes of $C_{10}$–$C_{16}$ | 94.5 | C=0.302 G=0.317 | Glutamic acid, Aspartic acid, Leucine, Histidine, Arginine, Lysine |

TABLE 1 (carbon sources: hydrocarbons)

| Microorganisms used | Culturing temperature | Hydrocarbons used (mixture) | Yield of cells (%) | Maximum specific growth rate (hour$^{-1}$) | Useful products |
|---|---|---|---|---|---|
| C + H | 37°C. | n-alkanes of $C_{10}$–$C_{16}$ | 96.4 | C=0.329 H=0.334 | Glutamic acid, Aspartic acid, Leucine, Histidine, Arginine, Lysine |
| C + I | 36°C. | n-alkanes of $C_{10}$–$C_{16}$ | 96.4 | C=0.328 I=0.337 | Glutamic acid, Aspartic acid, Leucine, Histidine, Vitamin $B_{12}$ |
| D + E | 32°C. | n-alkanes of $C_{10}$–$C_{16}$ | 86.3 | D=0.232 E=0.249 | Glutamic acid, Aspartic acid, Leucine, Lysine, Diaminopimelic acid, Homoserine, Ornithine |
| D + F | 37°C. | n-alkanes of $C_{10}$–$C_{16}$ | 98.1 | D=0.352 F=0.369 | Glutamic acid, Aspartic acid, Leucine, Lysine, Serine, Arginine |
| D + G | 36°C. | n-alkanes of $C_{10}$–$C_{16}$ | 92.8 | D=0.296 G=0.313 | Glutamic acid, Aspartic acid, Leucine, Lysine, Arginine |
| D + H | 38°C. | n-alkanes of $C_{10}$–$C_{16}$ | 97.1 | D=0.331 H=0.344 | Glutamic acid, Aspartic acid, Leucine, Lysine, Arginine |
| D + I | 35°C. | n-alkanes of $C_{10}$–$C_{16}$ | 96.8 | D=0.329 I=0.334 | Glutamic acid, Aspartic acid, Leucine, Lysine, Vitamin $B_{12}$ |
| B + J | 32°C. | n-alkanes of $C_{10}$–$C_{16}$ | 76.1 | B=0.173 J=0.188 | Glutamic acid, Aspartic acid, Leucine, Histidine, Arginine, Lysine |
| C + J | 32°C. | n-alkanes of $C_{10}$–$C_{16}$ | 74.7 | C=0.144 J=0.168 | Glutamic acid, Aspartic acid, Leucine, Histidine, Arginine, Lysine |
| D + J | 32°C. | n-alkanes of $C_{10}$–$C_{16}$ | 75.3 | D=0.172 J=0.185 | Glutamic acid, Aspartic acid, Arginine, Lysine, Leucine |
| K | 28°C. | n-alkanes of $C_{13}$–$C_{18}$ | 75.3 | 0.151 | Citric Acid |
| K + I | 37°C. | n-alkanes of $C_5$–$C_{18}$ | 93.7 | K=0.291 I=0.289 | Phenylalanine, Polycarboxylic acids, Citric acid, Glutamic acid, Alanine, Valine, Glycine, Lysine, Diaminopimelic acid, Homoserine, Ornithine, Citrulline, Tyrosine |
| L | 28°C. | n-alkanes of $C_{12}$–$C_{19}$ | 74.7 | 0.143 | Amylase |
| L + E | 40°C. | n-alkanes of $C_5$–$C_{19}$ | 93.2 | L=0.305 E=0.311 | Amylase, Fat, Lysine, Diaminopimelic acid, Homoserine, Ornithine, Phenylalanine, Tyrosine, Citrulline, Polycarboxylic acids |

TABLE 2 (carbon sources: carbohydrates)

| Microorganisms used | Culturing temperature | Carbon source | Yield of cells (%) | Maximum specific growth rate (hour$^{-1}$) | Useful products |
|---|---|---|---|---|---|
| D | 30°C. | Glucose | 81.7 | 0.204 | Aspartic acid, Glutamic acid, Leucine, Histidine |
| F | 45°C. | Glucose | 83.8 | 0.312 | Aspartic acid, Glutamic acid, Alanine, Leucine, Arginine, Lysine |
| D + F | 41°C. | Glucose | 95.6 | D=0.361 F=0.364 | Aspartic acid, Glutamic acid, Alanine, Leucine, Histidine, Arginine, Lysine |
| K | 28°C. | Glucose | 82.6 | 0.211 | Citric acid |
| I | 37°C. | Glucose | 83.3 | 0.327 | Glutamic acid, Alanine, Valine, Glycine, Lysine |
| K + I | 37°C. | Glucose | 96.8 | K=0.372 I=0.381 | Glutamic acid, Alanine, Valine, Citric acid, Lysine, Glycine |

EXAMPLE III

In this example, the following microorganisms are cultivated in the same manner as Example II:

Yeasts:
(Y - 1) *Candida tropicalis*
(Y - 2) *Candida intermedia*
(Y - 3) *Candida lipolytica*
(Y - 4) *Candida albicans*
(Y - 5) *Candida rugosa*
(Y - 6) *Candida petrophilum*
(Y - 7) *Candida brumptii*
(Y - 8) *Candida catenulata*
(Y - 9) *Candida melinii*

(Y - 10) *Candida parapsilosis*
(Y - 11) *Candida pulcherrima*
(Y - 12) *Candida reukaufii*
(Y - 13) *Candida cloacae*
(Y - 14) *Candida maltosa*
(Y - 15) *Candida tenuis*
(Y - 16) *Saccharomyceteae pichia guilliermondii*
(Y - 17) *Saccharomyceteae pichia farinosa*
(Y - 18) *Saccharomyceteae pichia vini*
(Y - 19) *Saccharomyceteae debaryomyces klosckeri*
(Y - 20) *Saccharomyceteae debaryomyces hansenii*
(Y - 21) *Saccharomyceteae debaryomyces vanriji*
(Y - 22) *Torulopsis petrophylum*
(Y - 23) *Torulopsis dattila*
(Y - 24) *Torulopsis famata*
(Y - 25) *Torulopsis sake*
(Y - 26) *Rhodotorula rubra*
(Y - 27) *Rhodotorula glutinis*
(Y - 28) *Rhodotorula gracilis*
(Y - 29) *Rhodotorula mucilaginosa*
(Y - 30) *Saccharomyceteae hansenula anonala*
(Y - 31) *Saccharomyceteae mycotorula japonica*
(Y - 32) *Trichosporon capitatum*
(Y - 33) *Trichosporon japonicum*
(Y - 34) *Brettanomyces lambicus*

Bacteria:
(B - 1) *Pseudomonas aeruginosa*
(B - 2) *Pseudomonas oleovoran*
(B - 3) *Pseudomonas ovalis*
(B - 4) *Micrococcus cerificans*
(B - 5) *Micrococcus paraffinae*
(B - 6) *Micrococcus glutamicus*
(B - 7) *Mycobacterium smegmatis*
(B - 8) *Mycobacterium lacticolum*
(B - 9) *Mycobacterium album*
(B - 10) *Mycobacterium rubrum*
(B - 11) *Mycobacterium paraffinicum*
(B - 12) *Corynebacterium petrophilum*
(B - 13) *Corynebacterium simplex*
(B - 14) *Corynebacterium hydrocarboclastus*
(B - 15) *Corynebacterium brevicale*
(B - 16) *Corynebacterium oleophilus*
(B - 17) *Nocardia opaca*
(B - 18) *Bacterium aliphaticum*
(B - 19) *Bacillus stearothermophilus*
(B - 20) *Bacillus subtilis*
(B - 21) *Achromobacter cycloclastes*
(B - 22) *Achromobacter pestifer*
(B - 23) *Achrombacter delmarvae*
(B - 24) *Nocardia gardneri*
(B - 25) *Nocardia corallina*
(B - 26) *Brevibacterium guale*

After completion of the fermentation period, the cells are counted in the same manner as in the above Examples and growth rate is calculated therefrom. The results for single and mixed culturing are given in the following Tables 3, 4 and 5.

TABLE 3

Single culturing (yeast) (carbon sources: hydrocarbons)

| Microorganism used | Culturing temperature | Yield of cells [cells (g)/substrate (g)] | Maximum specific growth rate (hour$^{-1}$) |
|---|---|---|---|
| (Y-1) | 27–30 | 0.734 | 0.120 |
| (Y-2) | 27–30 | 0.727 | 0.107 |
| (Y-3) | 27–30 | 0.742 | 0.131 |
| (Y-4) | 27–30 | 0.738 | 0.125 |

TABLE 3 -Continued

Single culturing (yeast) (carbon sources: hydrocarbons)

| Microorganism used | Culturing temperature | Yield of cells [cells (g)/substrate (g)] | Maximum specific growth rate (hour$^{-1}$) |
|---|---|---|---|
| (Y-5) | 28–30 | 0.733 | 0.117 |
| (Y-6) | 27–30 | 0.822 | 0.282 |
| (Y-7) | 25–28 | 0.634 | 0.043 |
| (Y-8) | 25–27 | 0.661 | 0.0615 |
| (Y-9) | 27–30 | 0.612 | 0.041 |
| (Y-10) | 28–30 | 0.737 | 0.162 |
| (Y-11) | 28–30 | 0.745 | 0.174 |
| (Y-12) | 27–29 | 0.711 | 0.087 |
| (Y-13) | 25–28 | 0.707 | 0.076 |
| (Y-14) | 26–29 | 0.71 | 0.081 |
| (Y-15) | 26–30 | 0.75 | 0.082 |
| (Y-16) | 27–30 | 0.875 | 0.293 |
| (Y-17) | 27–30 | 0.724 | 0.122 |
| (Y-18) | 26–30 | 0.656 | 0.0608 |
| (Y-19) | 26–30 | 0.748 | 0.114 |
| (Y-20) | 26–30 | 0.913 | 0.310 |
| (Y-21) | 25–28 | 0.641 | 0.0591 |
| (Y-22) | 27–30 | 0.776 | 0.215 |
| (Y-23) | 28–30 | 0.737 | 0.125 |
| (Y-24) | 28–30 | 0.747 | 0.145 |
| (Y-25) | 25–27 | 0.628 | 0.0573 |
| (Y-26) | 26–29 | 0.731 | 0.113 |
| (Y-27) | 26–30 | 0.751 | 0.117 |
| (Y-28) | 27–30 | 0.748 | 0.126 |
| (Y-29) | 26–29 | 0.735 | 0.111 |
| (Y-30) | 27–30 | 0.741 | 0.121 |
| (Y-31) | 27–30 | 0.756 | 0.124 |
| (Y-32) | 27–30 | 0.739 | 0.119 |
| (Y-33) | 26–29 | 0.757 | 0.133 |
| (Y-34) | 26–28 | 0.736 | 0.114 |

TABLE 4

Single culturing (bacterium) (carbon sources: hydrocarbons)

| Microorganism used | Culturing temperature | Yield of cells [cells (g)/substrate (g)] | Maximum specific growth rate (hour$^{-1}$) |
|---|---|---|---|
| (B-1) | 37–40 | 0.729 | 0.29 |
| (B-2) | 37 | 0.748 | 0.281 |
| (B-3) | 36 | 0.751 | 0.277 |
| (B-4) | 33–40 | 0.693 | 0.253 |
| (B-5) | 33–37 | 0.787 | 0.285 |
| (B-6) | 32–36 | 0.751 | 0.274 |
| (B-7) | 36–40 | 0.814 | 0.293 |
| (B-8) | 35–40 | 0.808 | 0.289 |
| (B-9) | 34–38 | 0.797 | 0.283 |
| (B-10) | 34–37 | 0.788 | 0.278 |
| (B-11) | 33–37 | 0.783 | 0.275 |
| (B-12) | 30–35 | 0.738 | 0.266 |
| (B-13) | 30–37 | 0.784 | 0.289 |
| (B-14) | 30–37 | 0.793 | 0.294 |
| (B-15) | 30–37 | 0.787 | 0.291 |
| (B-16) | 30–37 | 0.781 | 0.285 |
| (B-17) | 30–32 | 0.733 | 0.247 |
| (B-18) | 35–42 | 0.684 | 0.283 |
| (B-19) | 50–60 | 0.663 | 0.158 |
| (B-20) | 33–40 | 0.805 | 0.311 |
| (B-21) | 30–36 | 0.733 | 0.261 |
| (B-22) | 25–32 | 0.726 | 0.183 |
| (B-23) | 26–32 | 0.733 | 0.191 |
| (B-24) | 25–32 | 0.742 | 0.217 |
| (B-25) | 25–32 | 0.748 | 0.223 |
| (B-26) | 28–32 | 0.737 | 0.204 |

TABLE 5

Mixed culturing (carbon sources: hydrocarbons)

| Microorganism used | Culturing temperature | Yield of cells [cells (g)/substrate (g)] | Maximum specific growth rate (hour$^{-1}$) |
|---|---|---|---|
| (Y-2)+(B-1) | 35–37 | 0.945 | (Y-2)=0.311 (B-1)=0.32 |
| (Y-3)+(B-1) | 35–37 | 0.968 | (Y-3)=0.326 (B-1)=0.341 |

TABLE 5—Continued

Mixed culturing (carbon sources: hydrocarbons)

| Microorganism used | Culturing temperature | Yield of cells [cells (g)/substrate (g)] | Maximum specific growth rate (hour$^{-1}$) |
|---|---|---|---|
| (Y-4)+(B-1) | 34–36 | 0.913 | (Y-4)=0.307 (B-1)=0.314 |
| (Y-5)+(B-1) | 35–37 | 0.951 | (Y-5)=0.322 (B-1)=0.331 |
| (Y-6)+(B-1) | 35–37 | 1.151 | (Y-6)=0.351 (B-1)=0.375 |
| (Y-7)+(B-1) | 33–35 | 0.923 | (Y-7)=0.215 (B-1)=0.301 |
| (Y-8)+(B-1) | 34–35 | 0.925 | (Y-8)=0.236 (B-1)=0.305 |
| (Y-9)+(B-1) | 35–37 | 0.913 | (Y-9)=0.185 (B-1)=0.303 |
| (Y-10)+(B-1) | 37–38 | 0.966 | (Y-10)=0.331 (B-1)=0.353 |
| (Y-11)+(B-1) | 36–38 | 0.973 | (Y-11)=0.341 (B-1)=0.362 |
| (Y-12)+(B-1) | 35–37 | 0.917 | (Y-12)=0.288 (B-1)=0.312 |
| (Y-13)+(B-1) | 34–36 | 0.91 | (Y-13)=0.271 (B-1)=0.308 |
| (Y-14)+(B-1) | 34–36 | 0.913 | (Y-14)=0.279 (B-1)=0.31 |
| (Y-15)+(B-1) | 35–37 | 0.937 | (Y-15)=0.278 (B-1)=0.323 |
| (Y-16)+(B-1) | 36–38 | 1.203 | (Y-16)=0.372 (B-1)=0.391 |
| (Y-17)+(B-1) | 36–37 | 0.938 | (Y-17)=0.336 (B-1)=0.346 |
| (Y-19)+(B-1) | 34–36 | 0.951 | (Y-19)=0.327 (B-1)=0.333 |
| (Y-20)+(B-1) | 35–37 | 1.22 | (Y-20)=0.434 (B-1)=0.451 |
| (Y-22)+(B-1) | 35–37 | 0.983 | (Y-22)=0.378 (B-1)=0.393 |
| (Y-23)+(B-1) | 35–37 | 0.912 | (Y-23)=0.313 (B-1)=0.325 |
| (Y-18)+(B-1) | 34–36 | 0.931 | (Y-18)=0.215 (B-1)=0.311 |
| (Y-21)+(B-1) | 35–36 | 0.923 | (Y-21)=0.208 (B-1)=0.307 |
| (Y-24)+(B-1) | 36–38 | 0.973 | (Y-24)=0.336 (B-1)=0.348 |
| (Y-25)+(B-1) | 34–36 | 0.913 | (Y-25)=0.189 (B-1)=0.293 |
| (Y-26)+(B-1) | 36–37 | 0.955 | (Y-26)=0.318 (B-1)=0.325 |
| (Y-27)+(B-1) | 35–37 | 0.964 | (Y-27)=0.329 (B-1)=0.334 |
| (Y-28)+(B-1) | 36–38 | 0.961 | (Y-28)=0.323 (B-1)=0.336 |
| (Y-29)+(B-1) | 35–37 | 0.957 | (Y-29)=0.321 (B-1)=0.342 |
| (Y-31)+(B-1) | 36–38 | 0.971 | (Y-31)=0.331 (B-1)=0.344 |
| (Y-32)+(B-1) | 36–39 | 0.963 | (Y-32)=0.324 (B-1)=0.336 |
| (Y-33)+(B-1) | 36–38 | 0.983 | (Y-33)=0.337 (B-1)=0.348 |
| (Y-34)+(B-1) | 36–37 | 0.962 | (Y-34)=0.322 (B-1)=0.335 |
| (B-2) | 37 | 0.748 | 0.281 |
| (Y-1)+(B-2) | 34–36 | 0.951 | (Y-1)=0.313 (B-2)=0.322 |
| (Y-2)+(B-2) | 34–36 | 0.953 | (Y-2)=0.308 (B-2)=0.315 |
| (Y-3)+(B-2) | 35–37 | 0.972 | (Y-3)=0.33 (B-2)=0.347 |
| (Y-4)+(B-2) | 34–36 | 0.96 | (Y-4)=0.317 (B-2)=0.326 |
| (Y-5)+(B-2) | 35–37 | 0.971 | (Y-5)=0.318 (B-2)=0.322 |
| (Y-6)+(B-2) | 35–37 | 1.103 | (Y-6)=0.342 (B-2)=0.368 |
| (Y-7)+(B-2) | 33–35 | 0.921 | (Y-7)=0.201 (B-2)=0.298 |
| (Y-8)+(B-2) | 33–35 | 0.931 | (Y-8)=0.227 (B-2)=0.301 |
| (Y-9)+(B-2) | 35–37 | 0.917 | (Y-9)=0.181 (B-2)=0.295 |
| (Y-10)+(B-2) | 35–37 | 0.973 | (Y-10)=0.328 (B-2)=0.344 |
| (Y-11)+(B-2) | 35–37 | 0.977 | (Y-11)=0.333 (B-2)=0.351 |
| (Y-12)+(B-2) | 34–36 | 0.922 | (Y-12)=0.273 (B-2)=0.307 |
| (Y-13)+(B-2) | 34–36 | 0.921 | (Y-13)=0.266 (B-2)=0.293 |
| (Y-14)+(B-2) | 34–36 | 0.924 | (Y-14)=0.27 (B-2)=0.301 |
| (Y-15)+(B-2) | 35–37 | 0.941 | (Y-15)=0.271 (B-2)=0.317 |
| (Y-16)+(B-2) | 35–37 | 1.187 | (Y-16)=0.366 (B-2)=0.383 |
| (Y-17)+(B-2) | 35–37 | 0.941 | (Y-17)=0.328 (B-2)=0.337 |
| (Y-18)+(B-2) | 34–36 | 0.933 | (Y-18)=0.21 (B-2)=0.303 |
| (Y-19)+(B-2) | 34–36 | 0.947 | (Y-19)=0.313 (B-2)=0.321 |
| (Y-20)+(B-2) | 35–37 | 1.203 | (Y-20)=0.428 (B-2)=0.445 |
| (Y-21)+(B-2) | 34–36 | 0.931 | (Y-21)=0.201 (B-2)=0.295 |
| (Y-22)+(B-2) | 35–37 | 0.966 | (Y-22)=0.355 (B-2)=0.381 |
| (Y-23)+(B-2) | 35–37 | 0.904 | (Y-23)=0.307 (B-2)=0.312 |
| (Y-24)+(B-2) | 35–37 | 0.966 | (Y-24)=0.325 (B-2)=0.334 |
| (Y-26)+(B-2) | 35–37 | 0.947 | (Y-26)=0.311 (B-2)=0.321 |
| (Y-27)+(B-2) | 35–37 | 0.961 | (Y-27)=0.318 (B-2)=0.325 |

TABLE 5—Continued

Mixed culturing (carbon sources: hydrocarbons)

| Microorganism used | Culturing temperature | Yield of cells [cells (g)/substrate (g)] | Maximum specific growth rate (hour$^{-1}$) |
|---|---|---|---|
| (Y-28)+(B-2) | 35–37 | 0.965 | (Y-28)=0.322 (B-2)=0.331 |
| (Y-29)+(B-2) | 35–37 | 0.962 | (Y-29)=0.325 (B-2)=0.341 |
| (Y-30)+(B-2) | 35–37 | 0.951 | (Y-30)=0.298 (B-2)=0.305 |
| (Y-31)+(B-2) | 35–37 | 0.966 | (Y-31)=0.325 (B-2)=0.332 |
| (Y-32)+(B-2) | 35–37 | 0.951 | (Y-32)=0.316 (B-2)=0.325 |
| (Y-33)+(B-2) | 34–36 | 0.972 | (Y-33)=0.325 (B-2)=0.335 |
| (Y-34)+(B-2) | 34–36 | 0.954 | (Y-34)=0.318 (B-2)=0.324 |
| (B-3) | 36 | 0.751 | 0.277 |
| (Y-1)+(B-3) | 34–36 | 0.933 | (Y-1)=0.285 (B-3)=0.298 |
| (Y-2)+(B-3) | 34–36 | 0.937 | (Y-2)=0.261 (B-3)=0.283 |
| (Y-3)+(B-3) | 34–36 | 0.941 | (Y-3)=0.291 (B-3)=0.303 |
| (Y-4)+(B-3) | 34–36 | 0.938 | (Y-4)=0.29 (B-3)=0.295 |
| (Y-5)+(B-3) | 34–36 | 0.935 | (Y-5)=0.278 (B-3)=0.287 |
| (Y-6)+(B-3) | 35–36 | 1.07 | (Y-6)=0.346 (B-3)=0.358 |
| (Y-10)+(B-3) | 34–36 | 0.966 | (Y-10)=0.315 (B-3)=0.327 |
| (Y-11)+(B-3) | 34–36 | 0.969 | (Y-11)=0.322 (B-3)=0.338 |
| (Y-12)+(B-3) | 33–35 | 0.918 | (Y-12)=0.265 (B-3)=0.293 |
| (Y-13)+(B-3) | 32–34 | 0.913 | (Y-13)=0.257 (B-3)=0.285 |
| (Y-14)+(B-3) | 33–36 | 0.907 | (Y-14)=0.266 (B-3)=0.297 |
| (Y-16)+(B-3) | 34–36 | 1.155 | (Y-16)=0.358 (B-3)=0.377 |
| (Y-17)+(B-3) | 34–36 | 0.931 | (Y-17)=0.322 (B-3)=0.328 |
| (Y-18)+(B-3) | 33–36 | 0.927 | (Y-18)=0.203 (B-3)=0.295 |
| (Y-19)+(B-3) | 33–35 | 0.938 | (Y-19)=0.309 (B-3)=0.312 |
| (Y-20)+(B-3) | 34–36 | 1.116 | (Y-20)=0.411 (B-3)=0.424 |
| (Y-21)+(B-3) | 33–35 | 0.915 | (Y-21)=0.183 (B-3)=0.281 |
| (Y-22)+(B-3) | 34–36 | 0.953 | (Y-22)=0.348 (B-3)=0.351 |
| (Y-23)+(B-3) | 34–36 | 0.911 | (Y-23)=0.293 (B-3)=0.303 |
| (Y-24)+(B-3) | 34–36 | 0.959 | (Y-24)=0.314 (B-3)=0.326 |
| (Y-26)+(B-3) | 33–35 | 0.944 | (Y-26)=0.301 (B-3)=0.315 |
| (Y-27)+(B-3) | 33–35 | 0.954 | (Y-27)=0.309 (B-3)=0.317 |
| (Y-28)+(B-3) | 33–35 | 0.957 | (Y-28)=0.313 (B-3)=0.322 |
| (Y-29)+(B-3) | 33–35 | 0.943 | (Y-29)=0.312 (B-3)=0.315 |
| (Y-30)+(B-3) | 34–36 | 0.951 | (Y-30)=0.288 (B-3)=0.297 |
| (Y-31)+(B-3) | 34–36 | 0.955 | (Y-31)=0.317 (B-3)=0.326 |
| (Y-32)+(B-3) | 33–36 | 0.947 | (Y-32)=0.312 (B-3)=0.321 |
| (Y-33)+(B-3) | 33–35 | 0.965 | (Y-33)=0.325 (B-3)=0.331 |
| (Y-34)+(B-3) | 33–35 | 0.953 | (Y-34)=0.309 (B-3)=0.317 |
| (Y-1)+(B-4) | 33–36 | 0.917 | (Y-1)=0.306 (B-4)=0.318 |
| (Y-2)+(B-4) | 33–35 | 0.909 | (Y-2)=0.292 (B-4)=0.307 |
| (Y-3)+(B-4) | 33–35 | 0.945 | (Y-3)=0.306 (B-4)=0.311 |
| (Y-4)+(B-4) | 33–35 | 0.937 | (Y-4)=0.281 (B-4)=0.308 |
| (Y-5)+(B-4) | 34–36 | 0.911 | (Y-5)=0.298 (B-4)=0.305 |
| (Y-6)+(B-4) | 33–35 | 1.01 | (Y-6)=0.335 (B-4)=0.343 |
| (Y-7)+(B-4) | 32–34 | 0.905 | (Y-7)=0.197 (B-4)=0.283 |
| (Y-8)+(B-4) | 32–34 | 0.911 | (Y-8)=0.207 (B-4)=0.294 |
| (Y-9)+(B-4) | 33–35 | 0.901 | (Y-9)=0.177 (B-4)=0.273 |
| (Y-10)+(B-4) | 33–35 | 0.943 | (Y-10)=0.315 (B-4)=0.321 |
| (Y-11)+(B-4) | 33–35 | 0.957 | (Y-11)=0.323 (B-4)=0.341 |
| (Y-12)+(B-4) | 32–34 | 0.903 | (Y-12)=0.265 (B-4)=0.297 |
| (Y-13)+(B-4) | 32–34 | 0.897 | (Y-13)=0.233 (B-4)=0.278 |
| (Y-14)+(B-4) | 33–35 | 0.883 | (Y-14)=0.241 (B-4)=0.282 |
| (Y-15)+(B-4) | 33–35 | 0.912 | (Y-15)=0.263 (B-4)=0.282 |
| (Y-16)+(B-4) | 33–36 | 1.073 | (Y-16)=0.331 (B-4)=0.355 |
| (Y-18)+(B-4) | 33–35 | 0.902 | (Y-18)=0.188 (B-4)=0.283 |
| (Y-19)+(B-4) | 33–35 | 0.916 | (Y-19)=0.283 (B-4)=0.292 |
| (Y-20)+(B-4) | 33–36 | 1.033 | (Y-20)=0.392 (B-4)=0.404 |
| (Y-21)+(B-4) | 32–34 | 0.883 | (Y-21)=0.165 (B-4)=0.263 |
| (Y-22)+(B-4) | 33–35 | 0.921 | (Y-22)=0.336 (B-4)=0.341 |

TABLE 5—Continued

Mixed culturing (carbon sources: hydrocarbons)

| Microorganism used | Culturing temperature | Yield of cells [cells (g)/substrate (g)] | Maximum specific growth rate (hour$^{-1}$) |
|---|---|---|---|
| (Y-23)+(B-4) | 34–35 | 0.902 | (Y-23)=0.278 (B-4)=0.293 |
| (Y-24)+(B-4) | 33–35 | 0.933 | (Y-24)=0.295 (B-4)=0.314 |
| (Y-25)+(B-4) | 32–33 | 0.889 | (Y-25)=0.173 (B-4)=0.275 |
| (Y-26)+(B-4) | 32–34 | 0.931 | (Y-26)=0.296 (B-4)=0.316 |
| (Y-27)+(B-4) | 33–35 | 0.945 | (Y-27)=0.302 (B-4)=0.317 |
| (Y-28)+(B-4) | 33–35 | 0.944 | (Y-28)=0.306 (B-4)=0.312 |
| (Y-29)+(B-4) | 33–35 | 0.941 | (Y-29)=0.301 (B-4)=0.318 |
| (Y-30)+(B-4) | 33–35 | 0.937 | (Y-30)=0.261 (B-4)=0.283 |
| (Y-31)+(B-4) | 33–36 | 0.928 | (Y-31)=0.296 (B-4)=0.313 |
| (Y-32)+(B-4) | 33–35 | 0.923 | (Y-32)=0.287 (B-4)=0.304 |
| (Y-33)+(B-4) | 32–35 | 0.931 | (Y-33)=0.307 (B-4)=0.316 |
| (Y-34)+(B-4) | 32–34 | 0.926 | (Y-34)=0.275 (B-4)=0.298 |
| (Y-1)+(B-5) | 33–36 | 0.933 | (Y-1)=0.323 (B-5)=0.337 |
| (Y-2)+(B-5) | 33–37 | 0.925 | (Y-2)=0.314 (B-5)=0.326 |
| (Y-3)+(B-5) | 33–36 | 0.952 | (Y-3)=0.318 (B-5)=0.331 |
| (Y-4)+(B-5) | 33–35 | 0.955 | (Y-4)=0.305 (B-5)=0.327 |
| (Y-5)+(B-5) | 34–36 | 0.935 | (Y-5)=0.311 (B-5)=0.332 |
| (Y-6)+(B-5) | 33–36 | 1.125 | (Y-6)=0.351 (B-5)=0.366 |
| (Y-10)+(B-5) | 33–36 | 0.957 | (Y-10)=0.326 (B-5)=0.334 |
| (Y-11)+(B-5) | 33–37 | 0.963 | (Y-11)=0.336 (B-5)=0.347 |
| (Y-13)+(B-5) | 32–35 | 0.923 | (Y-13)=0.256 (B-5)=0.294 |
| (Y-16)+(B-5) | 33–36 | 1.107 | (Y-16)=0.343 (B-5)=0.361 |
| (Y-17)+(B-5) | 33–36 | 0.935 | (Y-17)=0.316 (B-5)=0.327 |
| (Y-18)+(B-5) | 32–35 | 0.922 | (Y-18)=0.203 (B-5)=0.298 |
| (Y-19)+(B-5) | 33–35 | 0.935 | (Y-19)=0.301 (B-5)=0.315 |
| (Y-20)+(B-5) | 33–36 | 1.071 | (Y-20)=0.404 (B-5)=0.418 |
| (Y-21)+(B-5) | 32–35 | 0.926 | (Y-21)=0.186 (B-5)=0.297 |
| (Y-22)+(B-5) | 33–36 | 0.947 | (Y-22)=0.348 (B-5)=0.353 |
| (Y-23)+(B-5) | 34–37 | 0.924 | (Y-23)=0.303 (B-5)=0.326 |
| (Y-24)+(B-5) | 34–36 | 0.954 | (Y-24)=0.308 (B-5)=0.327 |
| (Y-27)+(B-5) | 33–35 | 0.966 | (Y-27)=0.319 (B-5)=0.33 |
| (Y-28)+(B-5) | 33–36 | 0.963 | (Y-28)=0.325 (B-5)=0.336 |
| (Y-29)+(B-5) | 33–35 | 0.957 | (Y-29)=0.317 (B-5)=0.328 |
| (Y-30)+(B-5) | 33–36 | 0.953 | (Y-30)=0.281 (B-5)=0.302 |
| (Y-31)+(B-5) | 33–36 | 0.947 | (Y-31)=0.316 (B-5)=0.337 |
| (Y-32)+(B-5) | 33–35 | 0.943 | (Y-32)=0.305 (B-5)=0.323 |
| (Y-33)+(B-5) | 32–35 | 0.956 | (Y-33)=0.319 (B-5)=0.333 |
| (Y-34)+(B-5) | 32–35 | 0.944 | (Y-34)=0.293 (B-5)=0.325 |
| (Y-1)+(B-6) | 32–35 | 0.921 | (Y-1)=0.311 (B-6)=0.326 |
| (Y-2)=(B-6) | 32–35 | 0.913 | (Y-2)=0.298 (B-6)=0.304 |
| (Y-3)+(B-6) | 32–35 | 0.941 | (Y-3)=0.301 (B-6)=0.318 |
| (Y-5)+(B-6) | 32–35 | 0.923 | (Y-5)=0.293 (B-6)=0.313 |
| (Y-6)+(B-6) | 32–36 | 1.102 | (Y-6)=0.340 (B-6)=0.354 |
| (Y-10)+(B-6) | 32–36 | 0.945 | (Y-10)=0.314 (B-6)=0.328 |
| (Y-11)+(B-6) | 32–36 | 0.951 | (Y-11)=0.318 (B-6)=0.329 |
| (Y-13)+(B-6) | 31–34 | 0.914 | (Y-13)=0.244 (B-6)=0.283 |
| (Y-16)+(B-6) | 32–36 | 1.083 | (Y-16)=0.328 (B-6)=0.346 |
| (Y-17)+(B-6) | 32–36 | 0.923 | (Y-17)=0.305 (B-6)=0.313 |
| (Y-18)+(B-6) | 31–35 | 0.907 | (Y-18)=0.197 (B-6)=0.285 |
| (Y-19)+(B-6) | 31–35 | 0.919 | (Y-19)=0.287 (B-6)=0.306 |
| (Y-20)+(B-6) | 32–36 | 1.044 | (Y-20)=0.388 (B-6)=0.397 |
| (Y-21)+(B-6) | 31–34 | 0.905 | (Y-21)=0.173 (B-6)=0.285 |
| (Y-22)+(B-6) | 32–36 | 0.933 | (Y-22)=0.331 (B-6)=0.342 |
| (Y-23)+(B-6) | 32–36 | 0.916 | (Y-23)=0.288 (B-6)=0.304 |
| (Y-24)+(B-6) | 32–36 | 0.939 | (Y-24)=0.289 (B-6)=0.308 |
| (Y-27)+(B-6) | 31–35 | 0.948 | (Y-27)=0.273 (B-6)=0.296 |
| (Y-28)+(B-6) | 32–36 | 0.937 | (Y-28)=0.297 (B-6)=0.312 |

TABLE 5—Continued

Mixed culturing (carbon sources: hydrocarbons)

| Microorganism used | Culturing temperature | Yield of cells [cells (g)/substrate (g)] | Maximum specific growth rate (hour$^{-1}$) |
|---|---|---|---|
| (Y-29)+(B-6) | 32–35 | 0.935 | (Y-29)=0.286 (B-6)=0.302 |
| (Y-30)+(B-6) | 32–36 | 0.932 | (Y-30)=0.293 (B-6)=0.306 |
| (Y-31)+(B-6) | 32–36 | 0.926 | (Y-31)=0.288 (B-6)=0.301 |
| (Y-32)+(B-6) | 32–36 | 0.928 | (Y-32)=0.291 (B-6)=0.308 |
| (Y-33)+(B-6) | 31–34 | 0.934 | (Y-33)=0.302 (B-6)=0.316 |
| (Y-34)+(B-6) | 31–34 | 0.923 | (Y-34)=0.276 (B-6)=0.305 |
| (Y-1)+(B-7) | 34–37 | 0.957 | (Y-1)=0.338 (B-7)=0.356 |
| (Y-2)+(B-7) | 33–37 | 0.943 | (Y-2)=0.335 (B-7)=0.347 |
| (Y-3)+(B-7) | 33–37 | 0.972 | (Y-3)=0.333 (B-7)=0.354 |
| (Y-4)+(B-7) | 33–36 | 0.921 | (Y-4)=0.315 (B-7)=0.327 |
| (Y-5)+(B-7) | 33–37 | 0.958 | (Y-5)=0.331 (B-7)=0.344 |
| (Y-6)+(B-7) | 34–37 | 1.162 | (Y-6)=0.362 (B-7)=0.381 |
| (Y-7)+(B-7) | 32–36 | 0.931 | (Y-7)=0.216 (B-7)=0.305 |
| (Y-8)+(B-7) | 33–35 | 0.933 | (Y-8)=0.242 (B-7)=0.314 |
| (Y-9)+(B-7) | 33–37 | 0.925 | (Y-9)=0.198 (B-7)=0.311 |
| (Y-10)+(B-7) | 34–38 | 0.977 | (Y-10)=0.343 (B-7)=0.366 |
| (Y-11)+(B-7) | 33–38 | 0.986 | (Y-11)=0.352 (B-7)=0.368 |
| (Y-12)+(B-7) | 32–37 | 0.923 | (Y-12)=0.297 (B-7)=0.326 |
| (Y-13)+(B-7) | 33–36 | 0.922 | (Y-13)=0.283 (B-7)=0.314 |
| (Y-14)+(B-7) | 32–36 | 0.926 | (Y-14)=0.291 (B-7)=0.321 |
| (Y-15)+(B-7) | 33–37 | 0.942 | (Y-15)=0.296 (B-7)=0.335 |
| (Y-16)=(B-7) | 33–37 | 1.216 | (Y-16)=0.383 (B-7)=0.404 |
| (Y-17)+(B-7) | 33–37 | 0.947 | (Y-17)=0.344 (B-7)=0.357 |
| (Y-18)+(B-7) | 32–36 | 0.942 | (Y-18)=0.227 (B-7)=0.318 |
| (Y-19)=(B-7) | 32–36 | 0.963 | (Y-19)=0.332 (B-7)=0.346 |
| (Y-20)+(B-7) | 34–37 | 1.241 | (Y-20)=0.441 (B-7)=0.456 |
| (Y-21)+(B-7) | 32–36 | 0.934 | (Y-21)=0.219 (B-7)=0.313 |
| (Y-22)+(B-7) | 33–37 | 0.995 | (Y-22)=0.386 (B-7)=0.397 |
| (Y-23)+(B-7) | 33–37 | 0.928 | (Y-23)=0.324 (B-7)=0.335 |
| (Y-24)+(B-7) | 33–37 | 0.985 | (Y-24)=0.335 (B-7)=0.349 |
| (Y-25)+(B-7) | 32–36 | 0.926 | (Y-25)=0.197 (B-7)=0.301 |
| (Y-26)+(B-7) | 33–36 | 0.961 | (Y-26)=0.322 (B-7)=0.336 |
| (Y-27)+(B-7) | 33–37 | 0.973 | (Y-27)=0.331 (B-7)=0.343 |
| (Y-28)+(B-7) | 33–37 | 0.975 | (Y-28)=0.336 (B-7)=0.347 |
| (Y-29)+(B-7) | 33–36 | 0.966 | (Y-29)=0.332 (B-7)=0.351 |
| (Y-30)+(B-7) | 33–37 | 0.963 | (Y-30)=0.327 (B-7)=0.338 |
| (Y-31)+(B-7) | 32–37 | 0.977 | (Y-31)=0.341 (B-7)=0.356 |
| (Y-32)+(B-7) | 33–37 | 0.971 | (Y-32)=0.334 (B-7)=0.347 |
| (Y-33)+(B-7) | 33–37 | 0.988 | (Y-33)=0.346 (B-7)=0.357 |
| (Y-34)+(B-7) | 32–35 | 0.973 | (Y-34)=0.336 (B-7)=0.344 |
| (Y-1)+(B-8) | 33–37 | 0.953 | (Y-1)=0.311 (B-8)=0.348 |
| (Y-2)+(B-8) | 33–37 | 0.938 | (Y-2)=0.332 (B-8)=0.341 |
| (Y-3)+(B-8) | 33–37 | 0.963 | (Y-3)=0.324 (B-8)=0.342 |
| (Y-5)+(B-8) | 33–37 | 0.943 | (Y-5)=0.323 (B-8)=0.335 |
| (Y-10)+(B-8) | 34–38 | 0.965 | (Y-10)=0.331 (B-8)=0.352 |
| (Y-16)=(B-8) | 33–37 | 1.205 | (Y-16)=0.375 (B-8)=0.396 |
| (Y-17)+(B-8) | 32–36 | 0.933 | (Y-17)=0.335 (B-8)=0.346 |
| (Y-18)+(B-8) | 32–36 | 0.937 | (Y-18)=0.216 (B-8)=0.309 |
| (Y-19)+(B-8) | 32–36 | 0.955 | (Y-19)=0.323 (B-8)=0.337 |
| (Y-20)+(B-8) | 33–37 | 1.213 | (Y-20)=0.432 (B-8)=0.443 |
| (Y-21)+(B-8) | 32–36 | 0.926 | (Y-21)=0.213 (B-8)=0.306 |
| (Y-22)+(B-8) | 33–37 | 0.988 | (Y-22)=0.377 (B-8)=0.385 |
| (Y-23)+(B-8) | 33–37 | 0.919 | (Y-23)=0.316 (B-8)=0.327 |
| (Y-24)+(B-8) | 33–37 | 0.973 | (Y-24)=0.324 (B-8)=0.334 |
| (Y-27)+(B-8) | 33–37 | 0.965 | (Y-27)=0.334 (B-8)=0.345 |
| (Y-28)+(B-8) | 33–37 | 0.967 | (Y-28)=0.325 (B-8)=0.331 |
| (Y-29)+(B-8) | 33–36 | 0.958 | (Y-29)=0.324 (B-8)=0.346 |

TABLE 5—Continued

Mixed culturing (carbon sources: hydrocarbons)

| Microorganism used | Culturing temperature | Yield of cells [cells (g)/substrate (g)] | Maximum specific growth rate (hour⁻¹) |
|---|---|---|---|
| (Y-30)+(B-8) | 33-37 | 0.954 | (Y-30)=0.321 (B-8)=0.332 |
| (Y-31)+(B-8) | 32-38 | 0.966 | (Y-31)=0.336 (B-8)=0.345 |
| (Y-32)+(B-8) | 33-37 | 0.958 | (Y-32)=0.323 (B-8)=0.338 |
| (Y-33)+(B-8) | 32-36 | 0.973 | (Y-33)=0.335 (B-8)=0.347 |
| (Y-34)+(B-8) | 32-35 | 0.967 | (Y-34)=0.327 (B-8)=0.334 |
| (Y-1)+(B-9) | 33-37 | 0.947 | (Y-1)=0.323 (B-9)=0.336 |
| (Y-2)+(B-9) | 33-37 | 0.931 | (Y-2)=0.324 (B-9)=0.332 |
| (Y-3)+(B-9) | 33-37 | 0.954 | (Y-3)=0.316 (B-9)=0.327 |
| (Y-5)+(B-9) | 33-37 | 0.931 | (Y-5)=0.314 (B-9)=0.325 |
| (Y-11)+(B-9) | 33-37 | 0.962 | (Y-11)=0.328 (B-9)=0.337 |
| (Y-16)+(B-9) | 33-37 | 1.201 | (Y-16)=0.353 (B-9)=0.376 |
| (Y-17)+(B-9) | 32-36 | 0.921 | (Y-17)=0.324 (B-9)=0.333 |
| (Y-18)+(B-9) | 32-36 | 0.926 | (Y-18)=0.205 (B-9)=0.295 |
| (Y-19)+(B-9) | 32-36 | 0.941 | (Y-19)=0.311 (B-9)=0.323 |
| (Y-20)+(B-9) | 33-37 | 1.205 | (Y-20)=0.424 (B-9)=0.438 |
| (Y-21)+(B-9) | 32-36 | 0.918 | (Y-21)=0.207 (B-9)=0.298 |
| (Y-22)+(B-9) | 33-37 | 0.977 | (Y-22)=0.363 (B-9)=0.374 |
| (Y-23)+(B-9) | 33-37 | 0.911 | (Y-23)=0.308 (B-9)=0.316 |
| (Y-24)+(B-9) | 33-37 | 0.963 | (Y-24)=0.318 (B-9)=0.323 |
| (Y-27)+(B-9) | 32-37 | 0.953 | (Y-27)=0.324 (B-9)=0.336 |
| (Y-28)+(B-9) | 33-37 | 0.956 | (Y-28)=0.317 (B-9)=0.321 |
| (Y-29)+(B-9) | 32-36 | 0.946 | (Y-29)=0.315 (B-9)=0.327 |
| (Y-30)+(B-9) | 33-37 | 0.946 | (Y-30)=0.312 (B-9)=0.324 |
| (Y-31)+(B-9) | 32-37 | 0.957 | (Y-31)=0.324 (B-9)=0.335 |
| (Y-32)+(B-9) | 33-37 | 0.945 | (Y-32)=0.312 (B-9)=0.326 |
| (Y-33)+(B-9) | 32-36 | 0.965 | (Y-33)=0.323 (B-9)=0.334 |
| (Y-34)+(B-9) | 32-35 | 0.953 | (Y-34)=0.315 (B-9)=0.327 |
| (Y-1)+(B-10) | 33-37 | 0.938 | (Y-1)=0.312 (B-10)=0.325 |
| (Y-2)+(B-10) | 33-37 | 0.926 | (Y-2)=0.317 (B-10)=0.324 |
| (Y-3)+(B-10) | 33-37 | 0.943 | (Y-3)=0.308 (B-10)=0.313 |
| (Y-5)+(B-10) | 33-37 | 0.922 | (Y-5)=0.306 (B-10)=0.314 |
| (Y-17)+(B-10) | 32-36 | 0.913 | (Y-17)=0.312 (B-10)=0.321 |
| (Y-19)+(B-10) | 32-36 | 0.932 | (Y-19)=0.303 (B-10)=0.312 |
| (Y-20)+(B-10) | 33-37 | 1.186 | (Y-20)=0.417 (B-10)=0.425 |
| (Y-24)+(B-10) | 33-37 | 0.948 | (Y-24)=0.309 (B-10)=0.312 |
| (Y-27)+(B-10) | 32-37 | 0.941 | (Y-27)=0.313 (B-10)=0.325 |
| (Y-30)+(B-10) | 33-37 | 0.928 | (Y-30)=0.301 (B-10)=0.312 |
| (Y-31)+(B-10) | 33-37 | 0.945 | (Y-31)=0.315 (B-10)=0.326 |
| (Y-32)+(B-10) | 33-37 | 0.933 | (Y-32)=0.301 (B-10)=0.314 |
| (Y-33)+(B-10) | 32-36 | 0.952 | (Y-33)=0.312 (B-10)=0.325 |
| (Y-1)+(B-11) | 32-36 | 0.932 | (Y-1)=0.309 (B-11)=0.321 |
| (Y-2)+(B-11) | 32-36 | 0.928 | (Y-2)=0.321 (B-11)=0.327 |
| (Y-3)+(B-11) | 32-36 | 0.938 | (Y-3)=0.303 (B-11)=0.308 |
| (Y-5)+(B-11) | 33-37 | 0.931 | (Y-5)=0.314 (B-11)=0.322 |
| (Y-17)+(B-11) | 32-36 | 0.907 | (Y-17)=0.307 (B-11)=0.316 |
| (Y-19)+(B-11) | 32-36 | 0.928 | (Y-19)=0.297 (B-11)=0.306 |
| (Y-20)+(B-11) | 32-36 | 1.197 | (Y-20)=0.422 (B-11)=0.429 |
| (Y-24)+(B-11) | 33-37 | 0.953 | (Y-24)=0.313 (B-11)=0.319 |
| (Y-27)+(B-11) | 32-36 | 0.932 | (Y-27)=0.302 (B-11)=0.312 |
| (Y-30)+(B-11) | 32-36 | 0.919 | (Y-30)=0.293 (B-11)=0.301 |
| (Y-31)+(B-11) | 32-36 | 0.934 | (Y-31)=0.307 (B-11)=0.318 |
| (Y-32)+(B-11) | 32-36 | 0.923 | (Y-32)=0.287 (B-11)=0.303 |
| (Y-33)+(B-11) | 32-36 | 0.946 | (Y-33)=0.301 (B-11)=0.314 |
| (Y-1)+(B-12) | 30-34 | 0.909 | (Y-1)=0.301 (B-12)=0.312 |
| (Y-2)+(B-12) | 30-34 | 0.902 | (Y-2)=0.286 (B-12)=0.293 |
| (Y-3)+(B-12) | 30-34 | 0.932 | (Y-3)=0.288 (B-12)=0.302 |
| (Y-4)+(B-12) | 30-34 | 0.897 | (Y-4)=0.283 (B-12)=0.297 |

TABLE 5—Continued

Mixed culturing (carbon sources: hydrocarbons)

| Microorganism used | Culturing temperature | Yield of cells [cells (g)/substrate (g)] | Maximum specific growth rate (hour$^{-1}$) |
|---|---|---|---|
| (Y-5)+(B-12) | 30–34 | 0.904 | (Y-5)=0.275 (B-12)=0.294 |
| (Y-6)+(B-12) | 30–34 | 1.087 | (Y-6)=0.328 (B-12)=0.337 |
| (Y-7)+(B-12) | 30–33 | 0.906 | (Y-7)=0.179 (B-12)=0.274 |
| (Y-8)+(B-12) | 30–33 | 0.911 | (Y-8)=0.198 (B-12)=0.292 |
| (Y-9)+(B-12) | 30–34 | 0.893 | (Y-9)=0.168 (B-12)=0.278 |
| (Y-10)+(B-12) | 30–34 | 0.945 | (Y-10)=0.317 (B-12)=0.331 |
| (Y-11)+(B-12) | 30–34 | 0.951 | (Y-11)=0.317 (B-12)=0.335 |
| (Y-12)+(B-12) | 30–34 | 0.888 | (Y-12)=0.263 (B-12)=0.294 |
| (Y-13)+(B-12) | 30–33 | 0.879 | (Y-13)=0.255 (B-12)=0.286 |
| (Y-14)+(B-12) | 30–33 | 0.891 | (Y-14)=0.258 (B-12)=0.284 |
| (Y-15)+(B-12) | 30–33 | 0.914 | (Y-15)=0.256 (B-12)=0.287 |
| (Y-16)+(B-12) | 30–34 | 1.163 | (Y-16)=0.351 (B-12)=0.371 |
| (Y-17)+(B-12) | 30–34 | 0.915 | (Y-17)=0.312 (B-12)=0.325 |
| (Y-18)+(B-12) | 30–33 | 0.912 | (Y-18)=0.186 (B-12)=0.289 |
| (Y-19)+(B-12) | 30–33 | 0.932 | (Y-19)=0.303 (B-12)=0.314 |
| (Y-20)+(B-12) | 30–34 | 1.189 | (Y-20)=0.406 (B-12)=0.422 |
| (Y-21)+(B-12) | 30–33 | 0.893 | (Y-21)=0.187 (B-12)=0.276 |
| (Y-22)+(B-12) | 30–34 | 0.964 | (Y-22)=0.355 (B-12)=0.374 |
| (Y-23)+(B-12) | 30–34 | 0.885 | (Y-23)=0.285 (B-12)=0.301 |
| (Y-24)+(B-12) | 30–34 | 0.955 | (Y-24)=0.312 (B-12)=0.323 |
| (Y-25)+(B-12) | 30–33 | 0.886 | (Y-25)=0.173 (B-12)=0.275 |
| (Y-26)+(B-12) | 30–34 | 0.933 | (Y-26)=0.294 (B-12)=0.302 |
| (Y-27)+(B-12) | 30–34 | 0.947 | (Y-27)=0.306 (B-12)=0.317 |
| (Y-28)+(B-12) | 30–34 | 0.942 | (Y-28)=0.302 (B-12)=0.314 |
| (Y-29)+(B-12) | 30–34 | 0.934 | (Y-29)=0.305 (B-12)=0.321 |
| (Y-30)+(B-12) | 30–34 | 0.932 | (Y-30)=0.298 (B-12)=0.303 |
| (Y-31)+(B-12) | 30–34 | 0.949 | (Y-31)=0.314 (B-12)=0.325 |
| (Y-32)+(B-12) | 30–34 | 0.944 | (Y-32)=0.307 (B-12)=0.315 |
| (Y-33)+(B-12) | 30–34 | 0.967 | (Y-33)=0.306 (B-12)=0.313 |
| (Y-34)+(B-12) | 30–33 | 0.946 | (Y-34)=0.301 (B-12)=0.316 |
| (Y-1)+(B-13) | 30–36 | 0.927 | (Y-1)=0.319 (B-13)=0.328 |
| (Y-2)+(B-13) | 30–36 | 0.923 | (Y-2)=0.297 (B-13)=0.315 |
| (Y-3)+(B-13) | 30–36 | 0.951 | (Y-3)=0.299 (B-13)=0.314 |
| (Y-5)+(B-13) | 30–37 | 0.925 | (Y-5)=0.293 (B-13)=0.321 |
| (Y-10)+(B-13) | 30–37 | 0.962 | (Y-10)=0.336 (B-13)=0.348 |
| (Y-16)+(B-13) | 30–36 | 1.208 | (Y-16)=0.373 (B-13)=0.395 |
| (Y-17)+(B-13) | 30–36 | 0.936 | (Y-17)=0.332 (B-13)=0.342 |
| (Y-18)+(B-13) | 30–35 | 0.925 | (Y-18)=0.197 (B-13)=0.298 |
| (Y-19)+(B-13) | 30–36 | 0.953 | (Y-19)=0.319 (B-13)=0.326 |
| (Y-20)+(B-13) | 30–36 | 1.209 | (Y-20)=0.418 (B-13)=0.434 |
| (Y-21)+(B-13) | 30–34 | 0.915 | (Y-21)=0.206 (B-13)=0.297 |
| (Y-22)+(B-13) | 30–36 | 0.987 | (Y-22)=0.373 (B-13)=0.395 |
| (Y-23)+(B-13) | 30–37 | 0.913 | (Y-23)=0.304 (B-13)=0.324 |
| (Y-24)+(B-13) | 30–37 | 0.976 | (Y-24)=0.332 (B-13)=0.346 |
| (Y-27)+(B-13) | 30–36 | 0.964 | (Y-27)=0.328 (B-13)=0.337 |
| (Y-28)+(B-13) | 30–36 | 0.962 | (Y-28)=0.323 (B-13)=0.335 |
| (Y-29)+(B-13) | 30–35 | 0.955 | (Y-29)=0.316 (B-13)=0.333 |
| (Y-30)+(B-13) | 30–35 | 0.961 | (Y-30)=0.315 (B-13)=0.328 |
| (Y-31)+(B-13) | 30–35 | 0.968 | (Y-31)=0.329 (B-13)=0.334 |
| (Y-32)+(B-13) | 30–35 | 0.969 | (Y-32)=0.328 (B-13)=0.334 |
| (Y-33)+(B-13) | 30–36 | 0.988 | (Y-33)=0.319 (B-13)=0.326 |
| (Y-34)+(B-13) | 30–34 | 0.961 | (Y-34)=0.318 (B-13)=0.325 |
| (Y-3)+(B-14) | 30–36 | 0.964 | (Y-3)=0.303 (B-14)=0.326 |
| (Y-5)+(B-14) | 30–37 | 0.937 | (Y-5)=0.301 (B-14)=0.334 |
| (Y-10)+(B-14) | 30–37 | 0.975 | (Y-10)=0.347 (B-14)=0.352 |
| (Y-13)+(B-14) | 30–35 | 0.918 | (Y-13)=0.268 (B-14)=0.302 |
| (Y-16)+(B-14) | 30–36 | 1.188 | (Y-16)=0.381 (B-14)=0.406 |

TABLE 5—Continued

Mixed culturing (carbon sources: hydrocarbons)

| Microorganism used | Culturing temperature | Yield of cells [cells (g)/substrate (g)] | Maximum specific growth rate (hour⁻¹) |
|---|---|---|---|
| (Y-17)+(B-14) | 30–36 | 0.945 | (Y-17)=0.345 (B-14)=0.357 |
| (Y-18)+(B-14) | 30–35 | 0.936 | (Y-18)=0.208 (B-14)=0.305 |
| (Y-20)+(B-14) | 30–36 | 1.211 | (Y-20)=0.426 (B-14)=0.451 |
| (Y-21)+(B-14) | 30–35 | 0.927 | (Y-21)=0.214 (B-14)=0.309 |
| (Y-22)+(B-14) | 30–36 | 0.998 | (Y-22)=0.385 (B-14)=0.403 |
| (Y-23)+(B-14) | 30–36 | 0.925 | (Y-23)=0.318 (B-14)=0.335 |
| (Y-24)+(B-14) | 30–37 | 0.983 | (Y-24)=0.344 (B-14)=0.353 |
| (Y-27)+(B-14) | 30–36 | 0.977 | (Y-27)=0.337 (B-14)=0.341 |
| (Y-28)+(B-14) | 30–36 | 0.974 | (Y-28)=0.332 (B-14)=0.346 |
| (Y-29)+(B-14) | 30–35 | 0.966 | (Y-29)=0.323 (B-14)=0.349 |
| (Y-30)+(B-14) | 30–35 | 0.978 | (Y-30)=0.325 (B-14)=0.331 |
| (Y-31)+(B-14) | 30–35 | 0.972 | (Y-31)=0.334 (B-14)=0.348 |
| (Y-33)+(B-14) | 30–36 | 0.993 | (Y-33)=0.327 (B-14)=0.336 |
| (Y-34)+(B-14) | 30–35 | 0.975 | (Y-34)=0.329 (B-14)=0.335 |
| (B-15) | 30–37 | 0.787 | 0.291 |
| (Y-1)+(B-15) | 30–37 | 0.923 | (Y-1)=0.316 (B-15)=0.324 |
| (Y-2)+(B-15) | 30–36 | 0.926 | (Y-2)=0.293 (B-15)=0.312 |
| (Y-3)+(B-15) | 30–36 | 0.959 | (Y-3)=0.289 (B-15)=0.315 |
| (Y-5)+(B-15) | 30–37 | 0.931 | (Y-5)=0.288 (B-15)=0.317 |
| (Y-17)+(B-15) | 30–36 | 0.936 | (Y-17)=0.336 (B-15)=0.344 |
| (Y-19)+(B-15) | 30–36 | 0.958 | (Y-19)=0.321 (B-15)=0.333 |
| (Y-20)+(B-15) | 30–36 | 1.203 | (Y-20)=0.418 (B-15)=0.439 |
| (Y-24)+(B-15) | 30–37 | 0.977 | (Y-24)=0.337 (B-15)=0.345 |
| (Y-27)+(B-15) | 30–37 | 0.973 | (Y-27)=0.332 (B-15)=0.335 |
| (Y-30)+(B-15) | 30–35 | 0.972 | (Y-30)=0.316 (B-15)=0.324 |
| (Y-31)+(B-15) | 30–35 | 0.966 | (Y-31)=0.328 (B-15)=0.339 |
| (Y-32)+(B-15) | 30–35 | 0.970 | (Y-32)=0.331 (B-15)=0.338 |
| (Y-33)+(B-15) | 30–36 | 0.992 | (Y-33)=0.334 (B-15)=0.342 |
| B-16 | 30–37 | 0.781 | 0.285 |
| (Y-1)+(B-16) | 30–37 | 0.917 | (Y-1)=0.310 (B-16)=0.318 |
| (Y-2)+(B-16) | 30–36 | 0.923 | (Y-2)=0.291 (B-16)=0.307 |
| (Y-3)+(B-16) | 30–36 | 0.952 | (Y-3)=0.282 (B-16)=0.313 |
| (Y-5)+(B-16) | 30–37 | 0.926 | (Y-5)=0.286 (B-16)=0.314 |
| (Y-17)+(B-16) | 30–36 | 0.931 | (Y-17)=0.335 (B-16)=0.341 |
| (Y-19)+(B-16) | 30–36 | 0.954 | (Y-19)=0.318 (B-16)=0.327 |
| (Y-20)+(B-16) | 30–36 | 1.198 | (Y-20)=0.412 (B-16)=0.433 |
| (Y-24)+(B-16) | 30–37 | 0.973 | (Y-24)=0.331 (B-16)=0.341 |
| (Y-27)+(B-16) | 30–37 | 0.969 | (Y-27)=0.326 (B-16)=0.329 |
| (Y-30)+(B-16) | 30–35 | 0.965 | (Y-30)=0.311 (B-16)=0.320 |
| (Y-31)+(B-16) | 30–35 | 0.962 | (Y-31)=0.324 (B-16)=0.332 |
| (Y-32)+(B-16) | 30–35 | 0.964 | (Y-32)=0.328 (B-16)=0.334 |
| (Y-33)+(B-16) | 30–36 | 0.983 | (Y-33)=0.328 (B-16)=0.337 |
| (B-17) | 30–32 | 0.733 | 0.247 |
| (Y-1)+(B-17) | 30–32 | 0.895 | (Y-1)=0.284 (B-17)=0.298 |
| (Y-2)+(B-17) | 30–32 | 0.889 | (Y-2)=0.269 (B-17)=0.273 |
| (Y-3)+(B-17) | 30–32 | 0.918 | (Y-3)=0.262 (B-17)=0.281 |
| (Y-5)+(B-17) | 30–32 | 0.883 | (Y-5)=0.253 (B-17)=0.275 |
| (Y-10)+(B-17) | 30–32 | 0.927 | (Y-10)=0.294 (B-17)=0.316 |
| (Y-11)+(B-17) | 30–32 | 0.932 | (Y-11)=0.297 (B-17)=0.318 |
| (Y-16)+(B-17) | 30–32 | 1.086 | (Y-16)=0.331 (B-17)=0.352 |
| (Y-17)+(B-17) | 30–32 | 0.898 | (Y-17)=0.293 (B-17)=0.296 |
| (Y-18)+(B-17) | 29–32 | 0.887 | (Y-18)=0.167 (B-17)=0.264 |
| (Y-19)+(B-17) | 30–32 | 0.909 | (Y-19)=0.271 (B-17)=0.298 |
| (Y-20)+(B-17) | 30–32 | 1.132 | (Y-20)=0.383 (B-17)=0.401 |
| (Y-21)+(B-17) | 28–30 | 0.855 | (Y-21)=0.164 (B-17)=0.256 |
| (Y-22)+(B-17) | 30–32 | 0.942 | (Y-22)=0.332 (B-17)=0.357 |
| (Y-23)+(B-17) | 30–32 | 0.866 | (Y-23)=0.268 (B-17)=0.283 |
| (Y-24)+(B-17) | 30–32 | 0.973 | (Y-24)=0.291 (B-17)=0.305 |

TABLE 5 – Continued

Mixed culturing (carbon sources: hydrocarbons)

| Microorganism used | Culturing temperature | Yield of cells [cells (g)/substrate (g)] | Maximum specific growth rate (hour⁻¹) |
|---|---|---|---|
| (Y-27)+(B-17) | 30–32 | 0.923 | (Y-27)=0.284 (B-17)=0.299 |
| (Y-28)+(B-17) | 30–32 | 0.921 | (Y-28)=0.282 (B-17)=0.293 |
| (Y-29)+(B-17) | 30–32 | 0.918 | (Y-29)=0.287 (B-17)=0.301 |
| (Y-30)+(B-17) | 30–32 | 0.916 | (Y-30)=0.278 (B-17)=0.284 |
| (Y-31)+(B-17) | 30–32 | 0.925 | (Y-31)=0.297 (B-17)=0.305 |
| (Y-32)+(B-17) | 30–32 | 0.929 | (Y-32)=0.286 (B-17)=0.306 |
| (Y-33)+(B-17) | 30–32 | 0.942 | (Y-33)=0.283 (B-17)=0.292 |
| (Y-34)+(B-17) | 30–32 | 0.924 | (Y-34)=0.283 (B-17)=0.292 |
| (Y-1)+(B-18) | 30–37 | 0.956 | (Y-1)=0.318 (B-18)=0.327 |
| (Y-2)+(B-18) | 30–36 | 0.951 | (Y-2)=0.316 (B-18)=0.325 |
| (Y-4)+(B-18) | 31–37 | 0.973 | (Y-4)=0.311 (B-18)=0.319 |
| (Y-5)+(B-18) | 31–37 | 0.958 | (Y-5)=0.328 (B-18)=0.333 |
| (Y-6)+(B-18) | 30–36 | 1.172 | (Y-6)=0.357 (B-18)=0.376 |
| (Y-7)+(B-18) | 30–35 | 0.931 | (Y-7)=0.226 (B-18)=0.311 |
| (Y-8)+(B-18) | 30–35 | 0.933 | (Y-8)=0.273 (B-18)=0.314 |
| (Y-9)+(B-18) | 30–36 | 0.924 | (Y-9)=0.192 (B-18)=0.306 |
| (Y-10)+(B-18) | 30–37 | 0.975 | (Y-10)=0.337 (B-18)=0.361 |
| (Y-11)+(B-18) | 30–36 | 0.979 | (Y-11)=0.348 (B-18)=0.366 |
| (Y-12)+(B-18) | 30–35 | 0.923 | (Y-12)=0.294 (B-18)=0.317 |
| (Y-13)+(B-18) | 29–34 | 0.918 | (Y-13)=0.277 (B-18)=0.315 |
| (Y-14)+(B-18) | 30–35 | 0.919 | (Y-14)=0.286 (B-18)=0.319 |
| (Y-15)+(B-18) | 30–35 | 0.943 | (Y-15)=0.283 (B-18)=0.331 |
| (Y-16)+(B-18) | 30–35 | 1.215 | (Y-16)=0.378 (B-18)=0.399 |
| (Y-17)+(B-18) | 30–36 | 0.947 | (Y-17)=0.342 (B-18)=0.351 |
| (Y-18)+(B-18) | 30–35 | 0.938 | (Y-18)=0.226 (B-18)=0.319 |
| (Y-19)+(B-18) | 30–35 | 0.956 | (Y-19)=0.333 (B-18)=0.338 |
| (Y-20)+(B-18) | 30–36 | 1.231 | (Y-20)=0.441 (B-18)=0.457 |
| (Y-21)+(B-18) | 29–34 | 0.649 | (Y-21)=0.216 (B-18)=0.314 |
| (Y-22)+(B-18) | 30–36 | 0.989 | (Y-22)=0.385 (B-18)=0.401 |
| (Y-23)+(B-18) | 30–36 | 0.918 | (Y-23)=0.319 (B-18)=0.332 |
| (Y-24)+(B-18) | 30–36 | 0.981 | (Y-24)=0.342 (B-18)=0.353 |
| (Y-25)+(B-18) | 28–34 | 0.922 | (Y-25)=0.197 (B-18)=0.301 |
| (Y-26)+(B-18) | 30–35 | 0.963 | (Y-26)=0.324 (B-18)=0.335 |
| (Y-27)+(B-18) | 30–36 | 0.975 | (Y-27)=0.333 (B-18)=0.346 |
| (Y-28)+(B-18) | 30–36 | 0.968 | (Y-28)=0.331 (B-18)=0.342 |
| (Y-29)+(B-18) | 30–35 | 0.964 | (Y-29)=0.328 (B-18)=0.349 |
| (Y-30)+(B-18) | 30–35 | 0.957 | (Y-30)=0.327 (B-18)=0.334 |
| (Y-31)+(B-18) | 30–35 | 0.976 | (Y-31)=0.336 (B-18)=0.351 |
| (Y-32)+(B-18) | 30–36 | 0.971 | (Y-32)=0.332 (B-18)=0.343 |
| (Y-33)+(B-18) | 30–35 | 0.988 | (Y-33)=0.344 (B-18)=0.355 |
| (Y-34)+(B-18) | 29–34 | 0.969 | (Y-34)=0.328 (B-18)=0.341 |
| (Y-1)+(B-19) | 34–40 | 0.913 | (Y-1)=0.219 (B-19)=0.237 |
| (Y-2)+(B-19) | 35–41 | 0.918 | (Y-2)=0.212 (B-19)=0.231 |
| (Y-3)+(B-19) | 36–42 | 0.922 | (Y-3)=0.219 (B-19)=0.227 |
| (Y-4)+(B-19) | 36–41 | 0.917 | (Y-4)=0.198 (B-19)=0.206 |
| (Y-5)+(B-19) | 36–41 | 0.923 | (Y-5)=0.216 (B-19)=0.229 |
| (Y-6)+(B-19) | 35–41 | 1.106 | (Y-6)=0.298 (B-19)=0.247 |
| (Y-7)+(B-19) | 35–40 | 0.905 | (Y-7)=0.165 (B-19)=0.219 |
| (Y-8)+(B-19) | 34–39 | 0.902 | (Y-8)=0.171 (B-19)=0.233 |
| (Y-9)+(B-19) | 35–40 | 0.886 | (Y-9)=0.161 (B-19)=0.204 |
| (Y-10)+(B-19) | 35–41 | 0.924 | (Y-10)=0.223 (B-19)=0.207 |
| (Y-11)+(B-19) | 35–41 | 0.928 | (Y-11)=0.231 (B-19)=0.216 |
| (Y-12)+(B-19) | 35–40 | 0.993 | (Y-12)=0.182 (B-19)=0.208 |
| (Y-13)+(B-19) | 35–40 | 0.887 | (Y-13)=0.133 (B-19)=0.188 |
| (Y-14)+(B-19) | 34–40 | 0.892 | (Y-14)=0.147 (B-19)=0.1-3 |
| (Y-15)+(B-19) | 34–40 | 0.915 | (Y-15)=0.151 (B-19)=0.204 |
| (Y-16)+(B-19) | 35–40 | 1.143 | (Y-16)=0.311 (B-19)=0.268 |

TABLE 5—Continued

Mixed culturing (carbon sources: hydrocarbons)

| Microorganism used | Culturing temperature | Yield of cells [cells (g)/substrate (g)] | Maximum specific growth rate (hour$^{-1}$) |
|---|---|---|---|
| (Y-17)+(B-19) | 35–40 | 0.917 | (Y-17)=0.237 (B-19)=0.245 |
| (Y-18)+(B-19) | 35–41 | 0.911 | (Y-18)=0.186 (B-19)=0.203 |
| (Y-19)+(B-19) | 35–40 | 0.924 | (Y-19)=0.211 (B-19)=0.238 |
| (Y-20)+(B-19) | 35–40 | 1.018 | (Y-20)=0.355 (B-19)=0.276 |
| (Y-21)+(B-19) | 35–40 | 0.917 | (Y-21)=0.213 (B-19)=0.234 |
| (Y-22)+(B-19) | 35–40 | 0.953 | (Y-22)=0.272 (B-19)=0.223 |
| (Y-23)+(B-19) | 35–41 | 0.885 | (Y-23)=0.219 (B-19)=0.228 |
| (Y-24)+(B-19) | 36–41 | 0.946 | (Y-24)=0.226 (B-19)=0.239 |
| (Y-25)+(B-19) | 34–39 | 0.873 | (Y-25)=0.167 (B-19)=0.194 |
| (Y-26)+(B-19) | 34–40 | 0.921 | (Y-26)=0.207 (B-19)=0.221 |
| (Y-27)+(B-19) | 34–40 | 0.924 | (Y-27)=0.213 (B-19)=0.224 |
| (Y-28)+(B-19) | 35–40 | 0.918 | (Y-28)=0.226 (B-19)=0.238 |
| (Y-29)+(B-19) | 34–40 | 0.913 | (Y-29)=0.196 (B-19)=0.205 |
| (Y-30)+(B-19) | 35–40 | 0.907 | (Y-30)=0.201 (B-19)=0.217 |
| (Y-31)+(B-19) | 35–40 | 0.922 | (Y-31)=0.206 (B-19)=0.222 |
| (Y-32)+(B-19) | 35–40 | 0.926 | (Y-32)=0.193 (B-19)=0.208 |
| (Y-33)+(B-19) | 34–40 | 0.934 | (Y-33)=0.214 (B-19)=0.225 |
| (Y-34)+(B-19) | 34–39 | 0.923 | (Y-34)=0.186 (B-19)=0.209 |
| (Y-1)+(B-20) | 33–37 | 0.965 | (Y-1)=0.345 (B-20)=0.363 |
| (Y-2)+(B-20) | 32–37 | 0.957 | (Y-2)=0.344 (B-20)=0.358 |
| (Y-3)+(B-20) | 33–37 | 0.988 | (Y-3)=0.346 (B-20)=0.367 |
| (Y-4)+(B-20) | 33–37 | 0.942 | (Y-4)=0.326 (B-20)=0.334 |
| (Y-5)+(B-20) | 33–37 | 0.963 | (Y-5)=0.338 (B-20)=0.351 |
| (Y-6)+(B-20) | 33–37 | 1.184 | (Y-6)=0.373 (B-20)=0.395 |
| (Y-7)+(B-20) | 32–36 | 0.963 | (Y-7)=0.227 (B-20)=0.312 |
| (Y-8)+(B-20) | 32–36 | 0.937 | (Y-8)=0.256 (B-20)=0.323 |
| (Y-9)+(B-20) | 33–37 | 0.928 | (Y-9)=0.204 (B-20)=0.325 |
| (Y-10)+(B-20) | 33–37 | 0.981 | (Y-10)=0.358 (B-20)=0.377 |
| (Y-11)+(B-20) | 34–38 | 0.992 | (Y-11)=0.361 (B-20)=0.379 |
| (Y-12)+(B-20) | 33–37 | 0.939 | (Y-12)=0.302 (B-20)=0.336 |
| (Y-13)+(B-20) | 32–36 | 0.933 | (Y-13)=0.294 (B-20)=0.323 |
| (Y-14)+(B-20) | 32–36 | 0.937 | (Y-14)=0.301 (B-20)=0.332 |
| (Y-15)+(B-20) | 33–37 | 0.951 | (Y-15)=0.303 (B-20)=0.346 |
| (Y-16)+(B-20) | 33–38 | 1.208 | (Y-16)=0.394 (B-20)=0.415 |
| (Y-17)+(B-20) | 33–37 | 0.951 | (Y-17)=0.353 (B-20)=0.366 |
| (Y-18)+(B-20) | 32–37 | 0.938 | (Y-18)=0.237 (B-20)=0.322 |
| (Y-19)+(B-20) | 32–37 | 0.957 | (Y-19)=0.341 (B-20)=0.354 |
| (Y-20)+(B-20) | 33–37 | 1.223 | (Y-20)=0.448 (B-20)=0.465 |
| (Y-21)+(B-20) | 31–36 | 0.928 | (Y-21)=0.227 (B-20)=0.326 |
| (Y-22)+(B-20) | 33–37 | 0.989 | (Y-22)=0.393 (B-20)=0.404 |
| (Y-23)+(B-20) | 33–37 | 0.924 | (Y-23)=0.332 (B-20)=0.349 |
| (Y-24)+(B-20) | 34–38 | 0.981 | (Y-24)=0.341 (B-20)=0.355 |
| (Y-25)+(B-20) | 31–36 | 0.923 | (Y-25)=0.202 (B-20)=0.313 |
| (Y-26)+(B-20) | 32–36 | 0.957 | (Y-26)=0.331 (B-20)=0.347 |
| (Y-27)+(B-20) | 32–37 | 0.968 | (Y-27)=0.338 (B-20)=0.354 |
| (Y-28)+(B-20) | 33–37 | 0.969 | (Y-28)=0.344 (B-20)=0.365 |
| (Y-29)+(B-20) | 32–36 | 0.958 | (Y-29)=0.341 (B-20)=0.362 |
| (Y-30)+(B-20) | 33–37 | 0.956 | (Y-30)=0.333 (B-20)=0.347 |
| (Y-31)+(B-20) | 33–37 | 0.981 | (Y-31)=0.352 (B-20)=0.369 |
| (Y-32)+(B-20) | 33–37 | 0.967 | (Y-32)=0.348 (B-20)=0.356 |
| (Y-33)+(B-20) | 32–37 | 0.983 | (Y-33)=0.351 (B-20)=0.365 |
| (Y-34)+(B-20) | 31–36 | 0.968 | (Y-34)=0.342 (B-20)=0.354 |
| (Y-1)+(B-21) | 30–34 | 0.901 | (Y-1)=0.289 (B-21)=0.302 |
| (Y-2)+(B-21) | 30–34 | 0.898 | (Y-2)=0.277 (B-21)=0.283 |
| (Y-3)+(B-21) | 30–34 | 0.926 | (Y-3)=0.278 (B-21)=0.295 |
| (Y-4)+(B-21) | 30–34 | 0.888 | (Y-4)=0.274 (B-21)=0.281 |
| (Y-5)+(B-21) | 30–34 | 0.894 | (Y-5)=0.266 (B-21)=0.287 |

TABLE 5—Continued

Mixed culturing (carbon sources: hydrocarbons)

| Microorganism used | Culturing temperature | Yield of cells [cells (g)/substrate (g)] | Maximum specific growth rate (hour$^{-1}$) |
|---|---|---|---|
| (Y-6)+(B-21) | 30–34 | 1.063 | (Y-6)=0.317 (B-21)=0.325 |
| (Y-7)+(B-21) | 29–33 | 0.896 | (Y-7)=0.173 (B-21)=0.268 |
| (Y-8)+(B-21) | 29–33 | 0.902 | (Y-8)=0.189 (B-21)=0.283 |
| (Y-9)+(B-21) | 30–34 | 0.887 | (Y-9)=0.156 (B-21)=0.284 |
| (Y-10)+(B-21) | 30–34 | 0.934 | (Y-10)=0.308 (B-21)=0.321 |
| (Y-11)+(B-21) | 30–34 | 0.945 | (Y-11)=0.307 (B-21)=0.329 |
| (Y-12)+(B-21) | 30–34 | 0.878 | (Y-12)=0.256 (B-21)=0.282 |
| (Y-13)+(B-21) | 29–33 | 0.869 | (Y-13)=0.248 (B-21)=0.279 |
| (Y-14)+(B-21) | 30–34 | 0.883 | (Y-14)=0.247 (B-21)=0.274 |
| (Y-15)+(B-21) | 29–33 | 0.907 | (Y-15)=0.247 (B-21)=0.277 |
| (Y-16)+(B-21) | 30–34 | 1.133 | (Y-16)=0.342 (B-21)=0.362 |
| (Y-17)+(B-21) | 30–34 | 0.906 | (Y-17)=0.301 (B-21)=0.315 |
| (Y-18)+(B-21) | 29–33 | 0.907 | (Y-18)=0.175 (B-21)=0.277 |
| (Y-19)+(B-21) | 29–33 | 0.926 | (Y-19)=0.294 (B-21)=0.306 |
| (Y-20)+(B-21) | 30–34 | 1.172 | (Y-20)=0.389 (B-21)=0.408 |
| (Y-21)+(B-21) | 29–33 | 0.885 | (Y-21)=0.173 (B-21)=0.265 |
| (Y-22)+(B-21) | 30–34 | 0.958 | (Y-22)=0.347 (B-21)=0.362 |
| (Y-23)+(B-21) | 30–34 | 0.877 | (Y-23)=0.279 (B-21)=0.288 |
| (Y-24)+(B-21) | 30–34 | 0.943 | (Y-24)=0.301 (B-21)=0.313 |
| (Y-25)+(B-21) | 28–33 | 0.873 | (Y-25)=0.166 (B-21)=0.264 |
| (Y-26)+(B-21) | 29–33 | 0.929 | (Y-26)=0.282 (B-21)=0.293 |
| (Y-27)+(B-21) | 29–34 | 0.938 | (Y-27)=0.291 (B-21)=0.305 |
| (Y-28)+(B-21) | 30–34 | 0.936 | (Y-28)=0.292 (B-21)=0.311 |
| (Y-29)+(B-21) | 29–34 | 0.927 | (Y-29)=0.294 (B-21)=0.315 |
| (Y-30)+(B-21) | 30–34 | 0.926 | (Y-30)=0.287 (B-21)=0.296 |
| (Y-31)+(B-21) | 30–34 | 0.941 | (Y-31)=0.302 (B-21)=0.314 |
| (Y-32)+(B-21) | 30–34 | 0.935 | (Y-32)=0.293 (B-21)=0.305 |
| (Y-33)+(B-21) | 30–34 | 0.958 | (Y-33)=0.295 (B-21)=0.307 |
| (Y-34)+(B-21) | 29–33 | 0.939 | (Y-34)=0.286 (B-21)=0.301 |
| (Y-1)+(B-22) | 27–32 | 0.848 | (Y-1)=0.213 (B-22)=0.231 |
| (Y-2)+(B-22) | 27–32 | 0.836 | (Y-2)=0.186 (B-22)=0.215 |
| (Y-3)+(B-22) | 27–32 | 0.854 | (Y-3)=0.224 (B-22)=0.238 |
| (Y-4)+(B-22) | 27–32 | 0.851 | (Y-4)=0.217 (B-22)=0.237 |
| (Y-5)+(B-22) | 28–32 | 0.838 | (Y-5)=0.208 (B-22)=0.219 |
| (Y-6)+(B-22) | 27–32 | 0.893 | (Y-6)=0.302 (B-22)=0.276 |
| (Y-7)+(B-22) | 25–32 | 0.807 | (Y-7)=0.125 (B-22)=0.212 |
| (Y-8)+(B-22) | 25–32 | 0.815 | (Y-8)=0.141 (B-22)=0.218 |
| (Y-9)+(B-22) | 27–32 | 0.796 | (Y-9)=0.107 (B-22)=0.209 |
| (Y-10)+(B-22) | 28–32 | 0.845 | (Y-10)=0.251 (B-22)=0.266 |
| (Y-11)+(B-22) | 28–32 | 0.858 | (Y-11)=0.262 (B-22)=0.273 |
| (Y-12)+(B-22) | 27–32 | 0.821 | (Y-12)=0.161 (B-22)=0.227 |
| (Y-13)+(B-22) | 25–32 | 0.813 | (Y-13)=0.152 (B-22)=0.215 |
| (Y-14)+(B-22) | 26–32 | 0.824 | (Y-14)=0.158 (B-22)=0.223 |
| (Y-15)+(B-22) | 26–32 | 0.856 | (Y-15)=0.166 (B-22)=0.231 |
| (Y-16)+(B-22) | 27–32 | 0.931 | (Y-16)=0.299 (B-22)=0.271 |
| (Y-17)+(B-22) | 27–32 | 0.828 | (Y-17)=0.215 (B-22)=0.236 |
| (Y-18)+(B-22) | 26–32 | 0.809 | (Y-18)=0.142 (B-22)=0.208 |
| (Y-19)+(B-22) | 26–32 | 0.847 | (Y-19)=0.204 (B-22)=0.227 |
| (Y-20)+(B-22) | 27–32 | 0.932 | (Y-20)=0.325 (B-22)=0.257 |
| (Y-21)+(B-22) | 25–32 | 0.798 | (Y-21)=0.148 (B-22)=0.216 |
| (Y-22)+(B-22) | 25–32 | 0.859 | (Y-22)=0.243 (B-22)=0.229 |
| (Y-23)+(B-22) | 28–32 | 0.843 | (Y-23)=0.224 (B-22)=0.237 |
| (Y-24)+(B-22) | 28–32 | 0.851 | (Y-24)=0.238 (B-22)=0.246 |
| (Y-25)+(B-22) | 24–32 | 0.803 | (Y-25)=0.138 (B-22)=0.217 |
| (Y-26)+(B-22) | 26–32 | 0.835 | (Y-26)=0.197 (B-22)=0.231 |
| (Y-27)+(B-22) | 26–32 | 0.842 | (Y-27)=0.201 (B-22)=0.235 |
| (Y-28)+(B-22) | 27–32 | 0.838 | (Y-28)=0.228 (B-22)=0.239 |

TABLE 5—Continued

Mixed culturing (carbon sources: hydrocarbons)

| Microorganism used | Culturing temperature | Yield of cells [cells (g)/substrate (g)] | Maximum specific growth rate (hour$^{-1}$) |
|---|---|---|---|
| (Y-29)+(B-22) | 26–32 | 0.834 | (Y-29)=0.187 (B-22)=0.222 |
| (Y-30)+(B-22) | 27–32 | 0.841 | (Y-30)=0.224 (B-22)=0.238 |
| (Y-31)+(B-22) | 27–32 | 0.857 | (Y-31)=0.225 (B-22)=0.241 |
| (Y-32)+(B-22) | 27–32 | 0.836 | (Y-32)=0.195 (B-22)=0.218 |
| (Y-33)+(B-22) | 26–32 | 0.849 | (Y-33)=0.211 (B-22)=0.227 |
| (Y-34)+(B-22) | 26–32 | 0.833 | (Y-34)=0.188 (B-22)=0.216 |
| (Y-1)+(B-23) | 27–32 | 0.851 | (Y-1)=0.223 (B-23)=0.236 |
| (Y-2)+(B-23) | 27–32 | 0.845 | (Y-2)=0.188 (B-23)=0.214 |
| (Y-3)+(B-23) | 27–32 | 0.861 | (Y-3)=0.226 (B-23)=0.235 |
| (Y-4)+(B-23) | 27–32 | 0.857 | (Y-4)=0.221 (B-23)=0.239 |
| (Y-5)+(B-23) | 28–32 | 0.841 | (Y-5)=0.212 (B-23)=0.222 |
| (Y-6)+(B-23) | 27–32 | 0.897 | (Y-6)=0.305 (B-23)=0.277 |
| (Y-7)+(B-23) | 26–32 | 0.810 | (Y-7)=0.121 (B-23)=0.211 |
| (Y-8)+(B-23) | 26–32 | 0.818 | (Y-8)=0.137 (B-23)=0.216 |
| (Y-9)+(B-23) | 27–32 | 0.799 | (Y-9)=0.108 (B-23)=0.213 |
| (Y-10)+(B-23) | 28–32 | 0.848 | (Y-10)=0.255 (B-23)=0.268 |
| (Y-11)+(B-23) | 28–32 | 0.863 | (Y-11)=0.264 (B-23)=0.277 |
| (Y-12)+(B-23) | 27–32 | 0.825 | (Y-12)=0.166 (B-23)=0.231 |
| (Y-13)+(B-23) | 25–32 | 0.817 | (Y-13)=0.159 (B-23)=0.219 |
| (Y-14)+(B-23) | 26–32 | 0.826 | (Y-14)=0.155 (B-23)=0.225 |
| (Y-15)+(B-23) | 26–32 | 0.861 | (Y-15)=0.168 (B-23)=0.233 |
| (Y-16)+(B-23) | 27–32 | 0.933 | (Y-16)=0.295 (B-23)=0.273 |
| (Y-17)+(B-23) | 27–32 | 0.831 | (Y-17)=0.217 (B-23)=0.234 |
| (Y-18)+(B-23) | 26–32 | 0.811 | (Y-18)=0.138 (B-23)=0.205 |
| (Y-19)+(B-23) | 26–32 | 0.843 | (Y-19)=0.197 (B-23)=0.223 |
| (Y-20)+(B-23) | 27–32 | 0.935 | (Y-20)=0.317 (B-23)=0.252 |
| (Y-21)+(B-23) | 26–32 | 0.803 | (Y-21)=0.146 (B-23)=0.211 |
| (Y-22)+(B-23) | 26–32 | 0.862 | (Y-22)=0.245 (B-23)=0.226 |
| (Y-23)+(B-23) | 28–32 | 0.847 | (Y-23)=0.226 (B-23)=0.235 |
| (Y-24)+(B-23) | 28–32 | 0.854 | (Y-24)=0.234 (B-23)=0.247 |
| (Y-25)+(B-23) | 26–32 | 0.805 | (Y-25)=0.134 (B-23)=0.210 |
| (Y-26)+(B-23) | 26–32 | 0.838 | (Y-26)=0.195 (B-23)=0.229 |
| (Y-27)+(B-23) | 26–32 | 0.845 | (Y-27)=0.203 (B-23)=0.237 |
| (Y-28)+(B-23) | 27–32 | 0.837 | (Y-28)=0.226 (B-23)=0.235 |
| (Y-29)+(B-23) | 26–32 | 0.833 | (Y-29)=0.183 (B-23)=0.220 |
| (Y-30)+(B-23) | 27–32 | 0.844 | (Y-30)=0.226 (B-23)=0.237 |
| (Y-31)+(B-23) | 27–32 | 0.855 | (Y-31)=0.221 (B-23)=0.236 |
| (Y-32)+(B-23) | 27–32 | 0.833 | (Y-32)=0.194 (B-23)=0.214 |
| (Y-33)+(B-23) | 26–32 | 0.851 | (Y-33)=0.215 (B-23)=0.229 |
| (Y-34)+(B-23) | 26–32 | 0.837 | (Y-34)=0.185 (B-23)=0.212 |
| (Y-1)+(B-24) | 27–32 | 0.855 | (Y-1)=0.225 (B-24)=0.239 |
| (Y-2)+(B-24) | 27–32 | 0.848 | (Y-2)=0.185 (B-24)=0.226 |
| (Y-3)+(B-24) | 27–32 | 0.866 | (Y-3)=0.231 (B-24)=0.238 |
| (Y-4)+(B-24) | 27–32 | 0.854 | (Y-4)=0.224 (B-24)=0.242 |
| (Y-5)+(B-24) | 28–32 | 0.843 | (Y-5)=0.221 (B-24)=0.233 |
| (Y-6)+(B-24) | 27–32 | 0.907 | (Y-6)=0.307 (B-24)=0.278 |
| (Y-7)+(B-24) | 25–32 | 0.815 | (Y-7)=0.125 (B-24)=0.214 |
| (Y-8)+(B-24) | 25–32 | 0.821 | (Y-8)=0.142 (B-24)=0.219 |
| (Y-9)+(B-24) | 27–32 | 0.808 | (Y-9)=0.111 (B-24)=0.218 |
| (Y-10)+(B-24) | 28–32 | 0.852 | (Y-10)=0.257 (B-24)=0.271 |
| (Y-11)+(B-24) | 28–32 | 0.869 | (Y-11)=0.269 (B-24)=0.283 |
| (Y-12)+(B-24) | 27–32 | 0.831 | (Y-12)=0.169 (B-24)=0.234 |
| (Y-13)+(B-24) | 25–32 | 0.822 | (Y-13)=0.162 (B-24)=0.222 |
| (Y-14)+(B-24) | 26–32 | 0.833 | (Y-14)=0.158 (B-24)=0.227 |
| (Y-15)+(B-24) | 26–32 | 0.866 | (Y-15)=0.172 (B-24)=0.236 |
| (Y-16)+(B-24) | 27–32 | 0.937 | (Y-16)=0.201 (B-24)=0.269 |
| (Y-17)+(B-24) | 27–32 | 0.833 | (Y-17)=0.165 (B-24)=0.236 |

TABLE 5 – Continued

Mixed culturing (carbon sources: hydrocarbons)

| Microorganism used | Culturing temperature | Yield of cells [cells (g)/substrate (g)] | Maximum specific growth rate (hour$^{-1}$) |
|---|---|---|---|
| (Y-18)+(B-24) | 26–32 | 0.816 | (Y-18)=0.134 (B-24)=0.202 |
| (Y-19)+(B-24) | 26–32 | 0.845 | (Y-19)=0.203 (B-24)=0.226 |
| (Y-20)+(B-24) | 27–32 | 0.938 | (Y-20)=0.319 (B-24)=0.257 |
| (Y-21)+(B-24) | 25–32 | 0.809 | (Y-21)=0.148 (B-24)=0.215 |
| (Y-22)+(B-24) | 26–32 | 0.867 | (Y-22)=0.246 (B-24)=0.231 |
| (Y-23)+(B-24) | 28–32 | 0.851 | (Y-23)=0.231 (B-24)=0.242 |
| (Y-24)+(B-24) | 28–32 | 0.858 | (Y-24)=0.237 (B-24)=0.252 |
| (Y-25)+(B-24) | 25–32 | 0.809 | (Y-25)=0.138 (B-24)=0.213 |
| (Y-26)+(B-24) | 26–32 | 0.842 | (Y-26)=0.197 (B-24)=0.232 |
| (Y-27)++(B-24) | 26–32 | 0.848 | (Y-27)=0.206 (B-24)=0.241 |
| (Y-28)+(B-24) | 27–32 | 0.841 | (Y-28)=0.232 (B-24)=0.242 |
| (Y-29)+(B-24) | 26–32 | 0.838 | (Y-29)=0.194 (B-24)=0.225 |
| (Y-30)+(B-24) | 27–32 | 0.851 | (Y-30)=0.231 (B-24)=0.242 |
| (Y-31)+(B-24) | 27–32 | 0.859 | (Y-31)=0.227 (B-24)=0.244 |
| (Y-32)+(B-24) | 27–32 | 0.837 | (Y-32)=0.203 (B-24)=0.221 |
| (Y-33)+(B-24) | 26–32 | 0.855 | (Y-33)=0.223 (B-24)=0.233 |
| (Y-34)+(B-24) | 26–32 | 0.842 | (Y-34)=0.195 (B-24)=0.223 |
| (Y-1)+(B-25) | 27–32 | 0.861 | (Y-1)=0.228 (B-25)=0.243 |
| (Y-2)+(B-25) | 27–32 | 0.852 | (Y-2)=0.189 (B-25)=0.231 |
| (Y-3)+(B-25) | 27–32 | 0.871 | (Y-3)=0.235 (B-25)=0.242 |
| (Y-4)+(B-25) | 27–32 | 0.858 | (Y-4)=0.227 (B-25)=0.243 |
| (Y-5)+(B-25) | 28–32 | 0.847 | (Y-5)=0.226 (B-25)=0.239 |
| (Y-6)+(B-25) | 27–32 | 0.913 | (Y-6)=0.312 (B-25)=0.283 |
| (Y-7)+(B-25) | 25–32 | 0.822 | (Y-7)=0.128 (B-25)=0.229 |
| (Y-8)+(B-25) | 25–32 | 0.827 | (Y-8)=0.145 (B-25)=0.233 |
| (Y-9)+(B-25) | 27–32 | 0.813 | (Y-9)=0.114 (B-25)=0.238 |
| (Y-10)+(B-25) | 28–32 | 0.859 | (Y-10)=0.263 (B-25)=0.278 |
| (Y-11)+(B-25) | 28–32 | 0.873 | (Y-11)=0.273 (B-25)=0.287 |
| (Y-12)+(B-25) | 27–32 | 0.836 | (Y-12)=0.172 (B-25)=0.239 |
| (Y-13)+(B-25) | 25–32 | 0.829 | (Y-13)=0.168 (B-25)=0.231 |
| (Y-14)+(B-25) | 26–32 | 0.838 | (Y-14)=0.163 (B-25)=0.232 |
| (Y-15)+(B-25) | 26–32 | 0.871 | (Y-15)=0.175 (B-25)=0.241 |
| (Y-16)+(B-25) | 27–32 | 0.942 | (Y-16)=0.296 (B-25)=0.273 |
| (Y-17)+(B-25) | 27–32 | 0.842 | (Y-17)=0.169 (B-25)=0.242 |
| (Y-18)+(B-25) | 26–32 | 0.822 | (Y-18)=0.138 (B-25)=0.209 |
| (Y-19)+(B-25) | 26–32 | 0.852 | (Y-19)=0.211 (B-25)=0.232 |
| (Y-20)+(B-25) | 27–32 | 0.943 | (Y-20)=0.321 (B-25)=0.262 |
| (Y-21)+(B-25) | 25–32 | 0.812 | (Y-21)=0.153 (B-25)=0.229 |
| (Y-22)+(B-25) | 26–32 | 0.873 | (Y-22)=0.252 (B-25)=0.237 |
| (Y-23)+(B-25) | 28–32 | 0.858 | (Y-23)=0.235 (B-25)=0.246 |
| (Y-24)++(B-25) | 28–32 | 0.864 | (Y-24)=0.242 (B-25)=0.258 |
| (Y-25)+(B-25) | 25–32 | 0.815 | (Y-25)=0.144 (B-25)=0.228 |
| (Y-26)+(B-25) | 25–32 | 0.815 | (Y-26)=0.144 (B-25)=0.237 |
| (Y-27)+(B-25) | 26–32 | 0.852 | (Y-27)=0.213 (B-25)=0.249 |
| (Y-28)+(B-25) | 27–32 | 0.846 | (Y-28)=0.238 (B-25)=0.245 |
| (Y-20)+(B-25) | 26–32 | 0.843 | (Y-29)=0.198 (B-25)=0.237 |
| (Y-30)+(B-25) | 27–32 | 0.858 | (Y-30)=0.234 (B-25)=0.246 |
| (Y-31)+(B-25) | 27–32 | 0.863 | (Y-31)=0.232 (B-25)=0.249 |
| (Y-32)+(B-25) | 27–32 | 0.844 | (Y-32)=0.211 (B-25)=0.227 |
| (Y-33)+(B-25) | 26–32 | 0.861 | (Y-32)=0.229 (B-25)=0.236 |
| (Y-34)+(B-25) | 26–32 | 0.848 | (Y-34)=0.202 (B-25)=0.233 |
| (Y-1)+(B-26) | 28–32 | 0.856 | (Y-1)=0.227 (B-26)=0.241 |
| (Y-2)+(B-26) | 28–32 | 0.851 | (Y-2)=0.193 (B-26)=0.222 |
| (Y-3)+(B-26) | 28–32 | 0.865 | (Y-3)=0.232 (B-26)=0.244 |
| (Y-4)+(B-26) | 28–32 | 0.863 | (Y-4)=0.228 (B-26)=0.245 |
| (Y-5)+(B-26) | 28–32 | 0.847 | (Y-5)=0.217 (B-26)=0.228 |
| (Y-6)+(B-26) | 28–32 | 0.889 | (Y-6)=0.298 (B-26)=0.273 |

TABLE 5—Continued

Mixed culturing (carbon sources: hydrocarbons)

| Microorganism used | Culturing temperature | Yield of cells [cells (g)/substrate (g)] | Maximum specific growth rate (hour$^{-1}$) |
|---|---|---|---|
| (Y-7)+(B-26) | 27–32 | 0.818 | (Y-7)=0.129 (B-26)=0.218 |
| (Y-8)+(B-26) | 27–32 | 0.825 | (Y-8)=0.142 (B-26)=0.221 |
| (Y-9)+(B-26) | 28–32 | 0.803 | (Y-9)=0.311 (B-26)=0.217 |
| (Y-10)+(B-26) | 28–32 | 0.852 | (Y-10)=0.262 (B-26)=0.275 |
| (Y-11)+(B-26) | 28–32 | 0.868 | (Y-11)=0.271 (B-26)=0.282 |
| (Y-12)+(B-26) | 28–32 | 0.831 | (Y-12)=0.173 (B-26)=0.238 |
| (Y-13)+(B-26) | 26–32 | 0.824 | (Y-13)=0.164 (B-26)=0.226 |
| (Y-14)+(B-26) | 27–32 | 0.833 | (Y-14)=0.161 (B-26)=0.232 |
| (Y-15)+(B-26) | 27–32 | 0.867 | (Y-15)=0.175 (B-26)=0.242 |
| (Y-16)+(B-26) | 28–32 | 0.941 | (Y-16)=0.298 (B-26)=0.277 |
| (Y-17)+(B-26) | 28–32 | 0.838 | (Y-17)=0.223 (B-26)=0.239 |
| (Y-18)+(B-26) | 27–32 | 0.819 | (Y-19)=0.142 (B-26)=0.218 |
| (Y-19)+(B-26) | 27–32 | 0.852 | (Y-19)=0.200 (B-26)=0.231 |
| (Y-20)+(B-26) | 28–32 | 0.942 | (Y-20)=0.322 (B-26)=0.256 |
| (Y-21)+(B-26) | 27–32 | 0.809 | (Y-21)=0.149 (B-26)=0.217 |
| (Y-22)+(B-26) | 27–32 | 0.868 | (Y-22)=0.251 (B-26)=0.232 |
| (Y-23)+(B-26) | 28–32 | 0.853 | (Y-23)=0.233 (B-26)=0.241 |
| (Y-24)+(B-26) | 28–32 | 0.862 | (Y-24)=0.242 (B-26)=0.255 |
| (Y-25)+(B-26) | 27–32 | 0.813 | (Y-25)=0.139 (B-26)=0.218 |
| (Y-26)+(B-26) | 27–32 | 0.844 | (Y-26)=0.204 (B-26)=0.236 |
| (Y-27)+(B-26) | 27–32 | 0.856 | (Y-27)=0.207 (B-26)=0.242 |
| (Y-28)+(B-26) | 28–32 | 0.842 | (Y-28)=0.231 (B-26)=0.240 |
| (Y-29)+(B-26) | 27–32 | 0.843 | (Y-29)=0.197 (B-26)=0.235 |
| (Y-30)+(B-26) | 28–32 | 0.849 | (Y-30)=0.232 (B-26)=0.243 |
| (Y-31)+(B-26) | 28–32 | 0.862 | (Y-31)=0.226 (B-26)=0.241 |
| (Y-32)+(B-26) | 28–32 | 0.837 | (Y-32)=0.204 (B-26)=0.223 |
| (Y-33)+(B-26) | 27–32 | 0.857 | (Y-33)=0.221 (B-26)=0.233 |
| (Y-34)+(B-26) | 27–32 | 0.846 | (Y-34)=0.192 (B-26)=0.219 |

In the above Tables, the yields of cells is the ratio of dry mass of the total cells to mass of hydrocarbons or carbohydrates assimilated by the microorganisms. Similarly, the maximum specific growth rate is the rate of propagation [amount of cells produced (dry weight) per unit time] per unit cell mass (dry mass) in a logarithmic propagation period.

It is apparent from the above Tables that mixed culturing in accordance with this invention, produces superior results in respect of rate of propagation and associated metabolic products than with single culturing of the same mciroorganisms.

What is claimed is:

1. A process for propagating yeasts which comprises culturing at least one yeast strain in combination with at least one bacteria selected from the family of the group consisting of Actinomycetaceae, Achromobacteraceae, Bacillaceae, Bacteriaceae, Micrococcaceae, Pseudomonadaceae, Corynebacteriaceae, Mycobacteriaceae and Brevibacteriaceae which has a higher optimum temperature for growth than that of said yeast, under aerobic conditions in a nutrient medium having a suitable source of assimilable carbon and nitrogen at a temperature which is higher than the optimum temperature for growth of said yeast but not exceeding the temperature for optimum growth for said bacterium.

2. A process according to claim 1, wherein said yeast strain belongs to the family Cryptococcaceae or Endomycetaceae.

3. A process according to claim 1 wherein said carbon source is hydrocarbon.

4. A process according to claim 1 wherein said carbon source is carbohydrate.

5. A process according to claim 1 wherein said culturing temperature is from 25° at 47°C.

6. A process according to claim 1 wherein the pH of said nutrient medium is adjusted to from 3.5 to 5.5.

* * * * *